US005500942A

United States Patent [19]
Eickemeyer et al.

[11] Patent Number: 5,500,942
[45] Date of Patent: Mar. 19, 1996

[54] METHOD OF INDICATING PARALLEL EXECUTION COMPOUNDABILITY OF SCALAR INSTRUCTIONS BASED ON ANALYSIS OF PRESUMED INSTRUCTIONS

[75] Inventors: Richard J. Eickemeyer, Endicott; Stamatis Vassiliadis, Vestal, both of N.Y.

[73] Assignee: International Business Machines Corporation, Armonk, N.Y.

[21] Appl. No.: 457,765

[22] Filed: Jun. 1, 1995

Related U.S. Application Data

[63] Continuation of Ser. No. 184,891, Jan. 21, 1994, abandoned, which is a continuation of Ser. No. 15,272, Feb. 5, 1993, abandoned, which is a continuation of Ser. No. 519,382, May 4, 1990, abandoned.

[51] Int. Cl.⁶ ......................................... G06F 9/38
[52] U.S. Cl. ........................ 395/375; 395/500; 395/700; 395/800; 364/948.3; 364/DIG. 1
[58] Field of Search .................................. 395/500, 375, 395/700, 800

[56] References Cited

U.S. PATENT DOCUMENTS

| | | | |
|---|---|---|---|
| 4,295,193 | 10/1981 | Pomerene | 364/200 |
| 4,439,828 | 3/1984 | Martin | 364/200 |
| 4,454,578 | 6/1984 | Matsumoto et al. | 364/200 |
| 4,502,111 | 2/1985 | Riffe et al. | |
| 4,506,325 | 3/1985 | Bennett et al. | 364/200 |
| 4,847,755 | 7/1989 | Morrison et al. | 364/200 |
| 5,051,885 | 9/1991 | Yates, Jr. et al. | 364/200 |
| 5,051,940 | 9/1991 | Vassiliadis et al. | 364/736 |
| 5,202,967 | 4/1993 | Matsuzaki et al. | 395/375 |
| 5,203,002 | 4/1993 | Wetzel | 395/800 |
| 5,337,415 | 8/1994 | Delano et al. | 395/375 |

FOREIGN PATENT DOCUMENTS

| | | |
|---|---|---|
| 0354740 | 2/1990 | European Pat. Off. |
| 0363222 | 4/1990 | European Pat. Off. |
| 61-245239 | 3/1987 | Japan |

OTHER PUBLICATIONS

Wang, Lingtao, "Distributed Instruction Set Computer", *Proceedings of the International Conference on Parallel Processing*, vol. 1, Aug. 1988, pp. 426–429.

Higbee, "Overlapped Operation with Microprogramming", *IEEE Transactions on Computers*, vol. C–27, No. 3, Mar. 1978, pp. 270–275.

Acosta, R. D., et al, "An Instruction Issuing Approach to Enhancing Performance in Multiple Functional Unit Processors", IEEE Transactions on Computers, Fall, C–35, No. 9, Sep. 1986, pp. 815–828.

Anderson, V. W., et al, the IBM System/360 Model 91: "Machine Philosophy and Instruction Handling", computer structures: Principles and Examples (Siewiorek, et al, ed (McGraw–Hill, 1982, pp. 276–292.

(List continued on next page.)

*Primary Examiner*—Ken S. Kim
*Attorney, Agent, or Firm*—Lynn L. Augspurger; Laurence J. Marhoefer; Richard L. Aitken

[57] ABSTRACT

This is a method of compounding two or more instructions from an instruction stream without knowing the starting point or length of each individual instruction. All instructions include one OP Code at a predetermined field location which identifies the instruction and its length. Those instructions which qualify need to have appropriate tags to indicate they are candidates for compounding. In System 370 where instructions are either 2, 4 or 6 bytes in length, the field positions for the OP Code are presumed based on an estimated instruction length code. The value of each tag based on a presumed OP Code is recorded, and the instruction length code in the presumed OP Code is used to locate a complete sequence of possible instructions. Once an actual instruction boundary is found, the corresponding correct tag values are used to identify the commencement of a compound instruction, and other incorrectly generated tags are ignored.

24 Claims, 17 Drawing Sheets

OTHER PUBLICATIONS

Capozzi, A. J., et al, "Non–Sequential High–Performance Processing" IBM Technical Disclosure Bulletin, vol. 27, No. 5, Oct. 1984, pp. 2842–2844.

Chan, S., et al, "Building Parallelism into the Instruction Pipeline", High Performance Systems, Dec., 1989, pp. 53–60.

Murakami, K., et al, "SIMP (Single Instruction Stream/Multiple Instruction Pipelining): A Novel High–Speed Single Processor Architecture", Proceedings of the Sixteenth Annual Symposium on Computer Architecture, 1989, pp. 78–85.

Smith, J. E., "Dynamic Instructions Scheduling and the Astronautics ZS–1", IEEE Computer, Jul. 1989, pp. 21–35.

Smith, M. D., et al, "Limits on Multiple Instruction Issue", Asplos III, 1989, pp. 290–302.

Tomasulo, R. M., "An Efficient Algorithm for Exploiting Multiple Arithmetic Units", Computer Structures, Principles, and Examples (Siewiorek, et al ed), McGraw–Hill, 1982, pp. 293–302.

Wulf, P. S., "The WM Computer Architecture", Computer Architecture News, vol. 16, No. 1, Mar. 1988, pp. 70–84.

Jouppi, N. P., et al, "Available Instruction–Level Parallelism for Superscalar Pipelined Machines", ASPLOS III, 1989, pp. 272–282.

Jouppi, N. P., "The Non–Uniform Distribution of Instruction–Level and Machine Parallelism and its Effect on Performance", IEEE Transactions on Computers, vol. 38, No. 12, Dec., 1989, pp. 1645–1658.

Ryan, D. E., "Entails 80960: An Architecture Optimized for Embedded Control", IEEE Microcomputers, vol. 8, No. 3, Jun., 1988, pp. 63–76.

Colwell, R. P., et al, "A VLIW Architecture for a Trace Scheduling Compiler", IEEE Transactions on Computers, vol. 37, No. 8, Aug., 1988, pp. 967–979.

Fisher, J. A., "The VLIW Machine: A Multi–Processor for Compiling Scientific Code", IEEE Computer, Jul., 1984, pp. 45–53.

Berenbaum, A. D., "Introduction to the CRISP Instruction Set Architecture", Proceedings of Compcon, Spring, 1987, pp. 86–89.

Bandyopadhyay, S., et al, "Compiling for the CRISP Microprocessor", Proceedings of Compcon, Spring, 1987, pp. 96–100.

Hennessy, J., et al, "MIPS: A VSI Processor Architecture", Proceedings of the CMU Conference on VLSI Systems and Computations, 1981, pp. 337–346.

Patterson, E. A., "Reduced Instruction Set Computers", Communications of the ACM, vol. 28, No. 1, Jan. 1985, pp. 8–21.

Radin, G., "The 801 Mini–Computer", IBM Journal of Research and Development, vol. 27, No. 3, May, 1983, pp. 237–246.

Ditzel, D. R., et al, "Branch Folding in the Crisp Microprocessor: Reducing Branch Delay to Zero", Proceedings of Compcon, Spring 1987, pp. 2–9.

Hwu, W. W. et al, "Checkpoint Repair for High–Performance Out–of–Order Execution Machines", IEEE Transactions on Computers vol. C36, No. 12, Dec., 1987, pp. 1496–1594.

Lee, J. K. F., et al, "Branch Prediction Strategies in Branch Target Buffer Design", IEEE Computer, vol. 17, No. 1. Jan. 1984, pp. 6–22.

Riseman, E. M., "The Inhibition of Potential Parallelism by Conditional Jumps", IEEE Transactions on Computers, Dec., 1972, pp. 1405–1411.

Smith, J. E., "A Study of Branch Prediction Strategies", IEEE Proceedings of the Eight Annual Symposium on Computer Architecture, May 1981, pp. 135–148.

Archibold, James et al, Cache Coherence Protocols: "Evaluation Using a Multiprocessor Simulation Model", ACM Transactions on Computer Systems, vol. 4, No. 4, Nov. 1986, pp. 273–398.

Baer, J. L., et al "Multi–Level Cache Hierarchies: Organizations, Protocols, and Performance" Journal of Parallel and Distributed Computing vol. 6, 1989, pp. 451–476.

Smith, A. J., "Cache Memories", Computing Surveys, vol. 14, No. 3 Sep., 1982, pp. 473–530.

Smith, J. E., et al, "A Study of Instruction Cache Organizations and Replacement Policies", IEEE Proceedings of the Tenth Annual International Symposium on Computer Architecture, Jun., 1983, pp. 132–137.

Vassiliadis, S., et al, "Condition Code Predictory for Fixed–Arithmetic Units", International Journal of Electronics, vol. 66, No. 6, 1989, pp. 887–890.

Tucker, S. G., "The IBM 3090 System: An Overview", IBM Systems Journal, vol. 25, No. 1, 1986, pp. 4–19.

IBM Publication No. SA22–7200–0, Principles of Operation, IBM Enterprise Systems Architecture/370, 1988.

The Architecture of Pipelined Computers, by Peter M. Kogge Hemisphere Publishing Corporation, 1981.

"Early release of a processor following address translation prior to page access checking" IBM Technical Disclosure Bulletin (vol. 33 No. 10A, Mar. 1991), by R. J. Eberhard pp. 371–374.

| CATEGORY NUMBER | CATEGORY NAME |
|---|---|
| 1. | RR-FORMAT LOADS, LOGICALS, ARITHMETICS, COMPARES<br><br>• LCR – LOAD COMPLEMENT<br>• LPR – LOAD POSITIVE<br>• LNR – LOAD NEGATIVE<br>• LR – LOAD REGISTER<br>• LTR – LOAD AND TEST<br>• NR – AND<br>• OR – OR<br>• XR – EXCLUSIVE OR<br>• AR – ADD<br>• SR – SUBTRACT<br>• ALR – ADD LOGICAL<br>• SLR – SUBTRACT LOGICAL<br>• CLR – COMPARE LOGICAL<br>• CR – COMPARE |
| 2. | RS-FORMAT SHIFTS (NO STORAGE ACCESS)<br><br>• SRL – SHIFT RIGHT LOGICAL<br>• SLL – SHIFT LEFT LOGICAL<br>• SRA – SHIFT RIGHT ARITHMETIC<br>• SLA – SHIFT LEFT ARITHMETIC<br>• SRDL – SHIFT RIGHT LOGICAL<br>• SLDL – SHIFT LEFT LOGICAL<br>• SRDA – SHIFT RIGHT ARITHMETIC<br>• SLDA – SHIFT LEFT ARITHMETIC |
| 3. | BRANCHES–ON COUNT AND INDEX<br><br>• BCT – BRANCH ON COUNT (RX-FORMAT)<br>• BCTR – BRANCH ON COUNT (RR-FORMAT)<br>• BXH – BRANCH ON INDEX HIGH (RS-FORMAT)<br>• BXLE – BRANCH ON INDEX LOW (RS-FORMAT) |
| 4. | BRANCHES–ON CONDITION<br><br>• BC – BRANCH ON CONDITION (RX-FORMAT)<br>• BCR – BRANCH ON CONDITION (RR-FORMAT) |

| FIG. 4A |
|---|
| FIG. 4B |

| CATEGORY NUMBER | CATEGORY NAME |
|---|---|
| 5. | BRANCHES—AND LINK<br><br>• BAL — BRANCH AND LINK (RX—FORMAT)<br>• BALR — BRANCH AND LINK (RR—FORMAT)<br>• BAS — BRANCH AND SAVE (RX—FORMAT)<br>• BASR — BRANCH AND SAVE (RR—FORMAT) |
| 6. | STORES<br><br>• STCM — STORE CHARACTERS UNDER MASK<br>•   (0—4—BYTE STORE, RS—FORMAT)<br>• MVI — MOVE IMMEDIATE (ONE BYTE, SI—FORMAT)<br>• ST — STORE (4 BYTES)<br>• STC — STORE CHARACTER (ONE BYTE)<br>• STH — STORE HALF (2 BYTES) |
| 7. | LOADS<br><br>• LH — LOAD HALF (2 BYTES)<br>• L — LOAD (4 BYTES) |
| 8. | LA—LOAD ADDRESS |
| 9. | RX/SI/RS—FORMAT ARITHMETICS, LOGICALS, INSERTS, COMPARES<br><br>• A — ADD<br>• AH — ADD HALF<br>• AL — ADD LOGICAL<br>• N — AND<br>• O — OR<br>• S — SUBTRACT<br>• SH — SUBTRACT HALF<br>• SL — SUBTRACT LOGICAL<br>• X — EXCLUSIVE OR<br>• IC — INSERT CHARACTER<br>• ICM — INSERT CHARACTERS UNDER MASK (0—TO 4—BYTE FETCH)<br>• C — COMPARE<br>• CH — COMPARE HALF<br>• CL — COMPARE LOGICAL<br>• CLI — COMPARE LOGICAL IMMEDIATE<br>• CLM — COMPARE LOGICAL CHARACTER UNDER MASK |
| 10. | TM—TEST UNDER MASK |

FIG.4B

BYTE             0  2  4  6  8 10 12 14 16 18 20 22 24
                            TEXT
SEQUENCE      | 6    | 2| 2| 4   | 2| 6      | 2| 2 |
70
C-VECTOR      | 0| 0| 0| 1| 0| 1| 0| 0| 0| 0| 0| 1| 0|
72

BYTE      =  TEXT ENUMERATION
SEQUENCE  =  PROGRAM INSTRUCTION LENGTH SEQUENCE
C-VECTOR  =  COMPOUNDING BITS FOR EVERY TWO BYTES

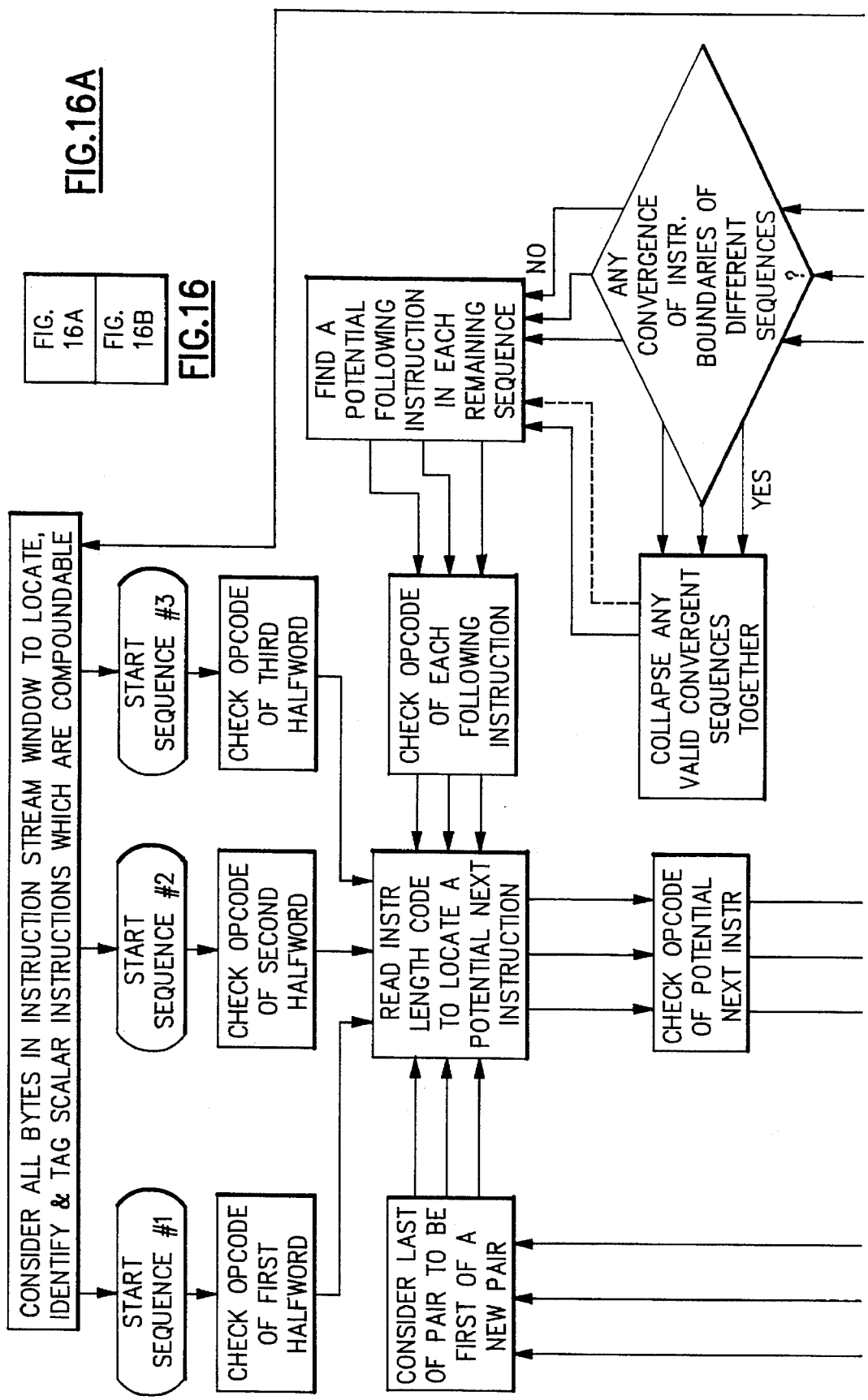

METHOD OF INDICATING PARALLEL EXECUTION COMPOUNDABILITY OF SCALAR INSTRUCTIONS BASED ON ANALYSIS OF PRESUMED INSTRUCTIONS

This application is a continuation of application Ser. No. 08/184,891, filed Jan. 21, 1994, now abandoned, which is a continuation of application Ser. No. 08/015,272, filed Feb. 5, 1993, now abandoned, which is a continuation of application Ser. No. 07/519,382, filed May 4, 1990, now abandoned.

RELATED APPLICATIONS

The following related applications are commonly owned by the same assignee and are incorporated by reference herein: "Data Dependency Collapsing Hardware Apparatus" filed Apr. 4, 1990, Ser. No. 07/504,910, now issued U.S. Pat. No. 5,051,940, and "Scalable Compound Instruction Set Machine Architecture" Ser. No. 07/519,384, filed May 4, 1990, now abandoned.

FIELD OF THE INVENTION

This invention relates to parallel processing of instructions in a computer, and more particularly relates to processing a stream of binary information having instructions therein for the purpose of identifying those instructions which can be executed in parallel in a specific computer configuration.

BACKGROUND OF THE INVENTION

The concept of parallel execution of instructions has helped to increase the performance of computer systems. Parallel execution is based on having separate functional units which can execute two or more of the same or different instructions simultaneously.

Another technique used to increase the performance of computer systems is pipelining. Pipelining does provide a form of parallel processing since it is possible to execute multiple instructions concurrently.

However, many times the benefits of parallel execution and/or pipelining are not achieved because of delays like those caused by data dependent interlocks and hardware dependent interlocks. An example of a data dependent interlock is a so-called write-read interlock where a first instruction must write its result before the second instruction can read and subsequently use it. An example of hardware dependent interlock is where a first instruction must use a particular hardware component and a second instruction must also use the same particular hardware component.

One of the techniques previously employed to avoid interlocks (sometimes called pipeline hazards) is called dynamic scheduling. Dynamic scheduling means that shortly before execution, the opcodes in an instruction stream are decoded to determine whether the instructions can be executed in parallel. Computers which practice one type of such dynamic scheduling are sometimes called superscalar machines. The criteria for dynamic scheduling are unique to each instruction set architecture, as well for the underlying implementation of that architecture in any given instruction processing unit. The effectiveness of dynamic scheduling is therefore limited by the complexity of the architecture which leads to extensive logic to determine which combinations of instructions can be executed in parallel, and thus may increase the cycle time of the instruction processing unit. The increased hardware and cycle time for such dynamic scheduling become even a bigger problem in architectures which have hundreds of different instructions.

There have also been some attempts to improve performance through so-called static scheduling which is done before the instruction stream is fetched from storage for execution. Static scheduling is achieved by moving code and thereby reordering the instruction sequence before execution. This reordering produces an equivalent instruction stream that will more fully utilize the hardware through parallel processing. Such static scheduling is typically done at compile time. However, the reordered instructions remain in their original form and conventional parallel processing still requires some form of dynamic determination just prior to execution of the instructions in order to decide whether to execute the next two instructions serially or in parallel.

There are other deficiencies with dynamic scheduling, static scheduling, or combinations thereof. For example, it is necessary to review each scalar instruction anew every time it is fetched for execution to determine its capability for parallel execution. There has been no way provided to identify and flag ahead of time those scalar instructions which have parallel execution capabilities.

Another deficiency with dynamic scheduling of the type implemented in superscalar machines is the manner in which scalar instructions are checked for possible parallel processing. Super scalar machines check scalar instructions based on their opcode descriptions, and no way is provided to take into account hardware utilization. Also, instructions are issued in FIFO fashion thereby eliminating the possibility of selective grouping to avoid or minimize the occurrence of interlocks.

There are some existing techniques which do seek to consider the hardware requirements for parallel instruction processing. One such system is called the Very Long Instruction Word machine in which a sophisticated compiler rearranges instructions so that hardware instruction scheduling is simplified. In this approach the compiler must be more complex than standard compilers so that a bigger window can be used for purposes of finding more parallelism in an instruction stream. But the resulting instructions may not necessarily be object code compatible with the pre-existing architecture, thereby solving one problem while creating additional new problems. Also, substantial additional problems arise due to frequent branching which limits its parallelism.

A recent innovation which seeks to more fully exploit parallel execution of instructions is called Scalable Compound Instruction Set Machines (SCISM). A compound instruction is created by pre-processing an instruction stream in order to look for sets of two or more adjacent scalar instructions that can be executed in parallel. In some instances certain types of interlocked instructions can be compounded for parallel execution where the interlocks are collapsible in a particular hardware configuration. In other configurations where the interlocks are non-collapsible, the instructions having data dependent or hardware dependent interlocks are excluded from groups forming compound instructions. Each compound instruction is identified by control information such as tags associated with the compound instruction, and the length of a compound instruction is scalable over a range beginning with a set of two scalar instructions up to whatever maximum number of individual scalar instructions can be processed together by the specific hardware implementation.

When an instruction is fetched for execution, the instruction boundaries must be known in order to allow proper execution. However, where an instruction stream is preprocessed for purposes of creating compound instructions, the instruction boundaries are often not evident merely by examining a byte string. This is particularly true with architectures which allow variable length instructions. Further complications arise when the architecture allows data and instructions to be intermixed.

For example, in the IBM System 370 architecture, both of these difficulties make the pre-processing of an instruction stream to locate suitable scalar instruction groupings a very complex problem. First, the instructions have three possible lengths—two bytes or four bytes or six bytes. Even though the actual length of a particular instruction is indicated in the first two bits of the opcode of the instruction, the beginning of an instruction in a string of bytes cannot be readily identified by mere inspection. Second, instructions and data can be intermixed. Accordingly, the existence or non-existence of a reference point in an instruction byte stream is of critical importance for this invention. A reference point is defined as the knowledge of where instructions begin or where instruction boundaries are. Unless additional information has been added to the instruction stream, instruction boundaries are usually known only at compile time or at execution time when the instructions are fetched by a CPU.

BRIEF SUMMARY AND OBJECTS OF THE INVENTION

In view of the foregoing, it is an object of the present invention to provide a technique for generating compound instructions from a binary instruction stream without knowing where instructions start and without knowing which bytes contain data instead of instructions.

Another object of the invention is to add control information to the instruction stream including grouping information indicating where a compound instruction starts as well as indicating the number of scalar instructions which are incorporated into the compound instruction.

A further object is to provide a technique which is applicable to complex instruction architectures having variable length instructions and data intermixed with instructions, and which is also applicable to RISC architectures wherein instructions are usually a constant length and wherein data is not mixed with instructions.

Still another object is to provide a method of pre-processing an instruction stream to create compound instructions composed of scalar instructions which have still retained their original contents. A related object is to create compound instructions without changing the object code of the scalar instructions which form the compound instruction, thereby allowing existing programs to realize a performance improvement on a compound instruction machine while maintaining compatibility with previously implemented scalar instruction machines.

An additional object is to provide a method of pre-processing an instruction stream to create compound instructions, wherein the method can be implemented by software and/or hardware at various points in the computer system prior to instruction execution. A related object is to provide a method of pre-processing of instructions which operates on a binary instruction stream as part of a post-compiler, or as part of an in-memory compounder, or as part of cache instruction compounding unit, and which can start compounding instructions at the beginning of a byte stream without knowing the boundaries of the instructions.

Thus, the invention seeks to achieve the aforementioned objectives by pre-processing a set of instructions (or a program) to determine statically which instructions may be combined into compound instructions. Such processing is done in a typical embodiment by software and/or hardware means which will look for classes of instructions that can be executed in parallel in a particular computer system configuration. The instruction classes and the compounding rules are implementation specific and will vary depending on the number and type of functional execution units. While keeping their original sequence and object code intact, individual instructions are selectively grouped and combined with one or more other adjacent scalar instructions to form a compound instruction byte stream having both compounded scalar instructions for parallel execution and non-compounded scalar instructions for execution singly. Control information is appended to identify information relevant to the execution of the compound instructions.

More specifically, this invention provides a technique of compounding two or more scalar instructions from an instruction stream without knowing the starting point or length of each individual instruction. All possible instruction sequences are considered by looking at a predetermined field location for a presumed instruction length. In an IBM System/370 system, the instruction length is part of the opcode. In other systems, the instruction length is part of the operands. In some instances of practicing the technique of the invention, a valid convergence occurs between two possible instruction sequences, thereby narrowing the possible choices for instruction boundaries. In other instances where no valid convergence occurs, the various possible instruction sequences are followed to the end of the byte stream. The actual instructions boundaries are not known until the instructions are fetched for execution. So all authentic instructions as well as all spurious instructions are encoded with identifier tag bits based on the particular compounding rules which apply to the hardware configuration. In IBM System/370 architecture instructions are either two, four or six bytes in length, based on the instruction length codes. The value of each identifier tag bit (based on a presumed opcode position) is recorded for each possible two, four or six byte instruction. Once an actual instruction boundary is found at execution, the corresponding correct tag values are used to identify the commencement of a compound instruction and/or the commencement of a non-compounded instruction, and other incorrectly generated tags are ignored.

These and other objects, features and advantages of the invention will be apparent to those skilled in the art in view of the following detailed description and accompanying drawings.

BRIEF DESCRIPTION OF THE DRAWINGS

FIG. 4 (FIG. 4 comprising FIGS. 4A and 4B) illustrates selective categorization of instructions executed by an existing scalar machine;

DETAILED DESCRIPTION OF PREFERRED EMBODIMENTS

As shown in the various drawings to be described in more detail hereinafter, a recent innovation called a Scalable Compound Instruction Set Machine (SCISM) provides for a stream of scalar instructions to be compounded or grouped together before instruction decode time so that they are already flagged and identified for simultaneous parallel execution by appropriate instruction execution units. Since such compounding does not change the object code, existing programs can realize a performance improvement while maintaining compatibility with previously implemented systems.

Figure 1:
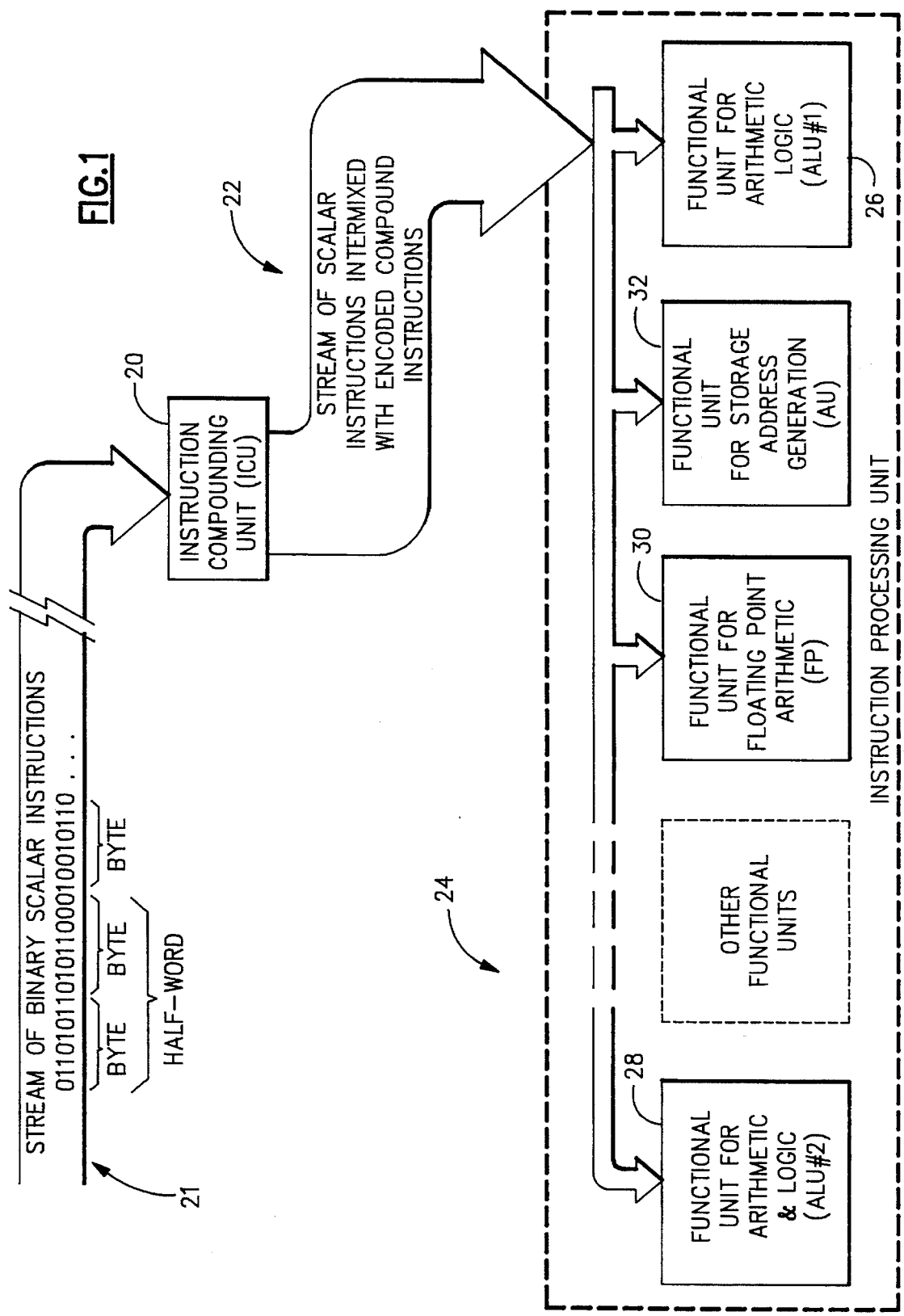
FIG. 1 is a high level schematic diagram of the invention.

As generally shown in FIG. 1, an instruction compounding unit 20 takes a stream of binary scalar instructions 21 (with or without data included therein) and selectively groups some of the adjacent scalar instructions to form encoded compound instructions. A resulting compounded instruction stream 22 therefore combines scalar instructions not capable of parallel execution and compound instructions formed by groups of scalar instructions which are capable of parallel execution. When a scalar instruction is presented to an instruction processing unit 24, it is routed to the appropriate functional unit for serial execution. When a compound instruction is presented to the instruction processing unit 24, its scalar components are each routed to their appropriate functional unit or interlock collapsing unit for simultaneous parallel execution. Typical functional units include but are not limited to an arithmetic and logic unit (ALU) 26, 28, a floating point arithmetic unit (FP) 30, and a store address generation unit (AU) 32. An exemplary data dependency collapsing unit is disclosed in co-pending application Serial No. 07/504,910, entitled "Data Dependency Collapsing Hardware Apparatus) filed Apr. 4, 1990. "Collapsing" was a word first used in connection with such an apparatus, and as such may be considered as being defined by the co-pending application U.S. Ser. No. 07/504,910.

It is to be understood that the technique of the invention is intended to facilitate the parallel issue and execution of instructions in all computer architectures that process multiple instructions per cycle (although certain instructions may require more than one cycle to be executed).

Figure 2:
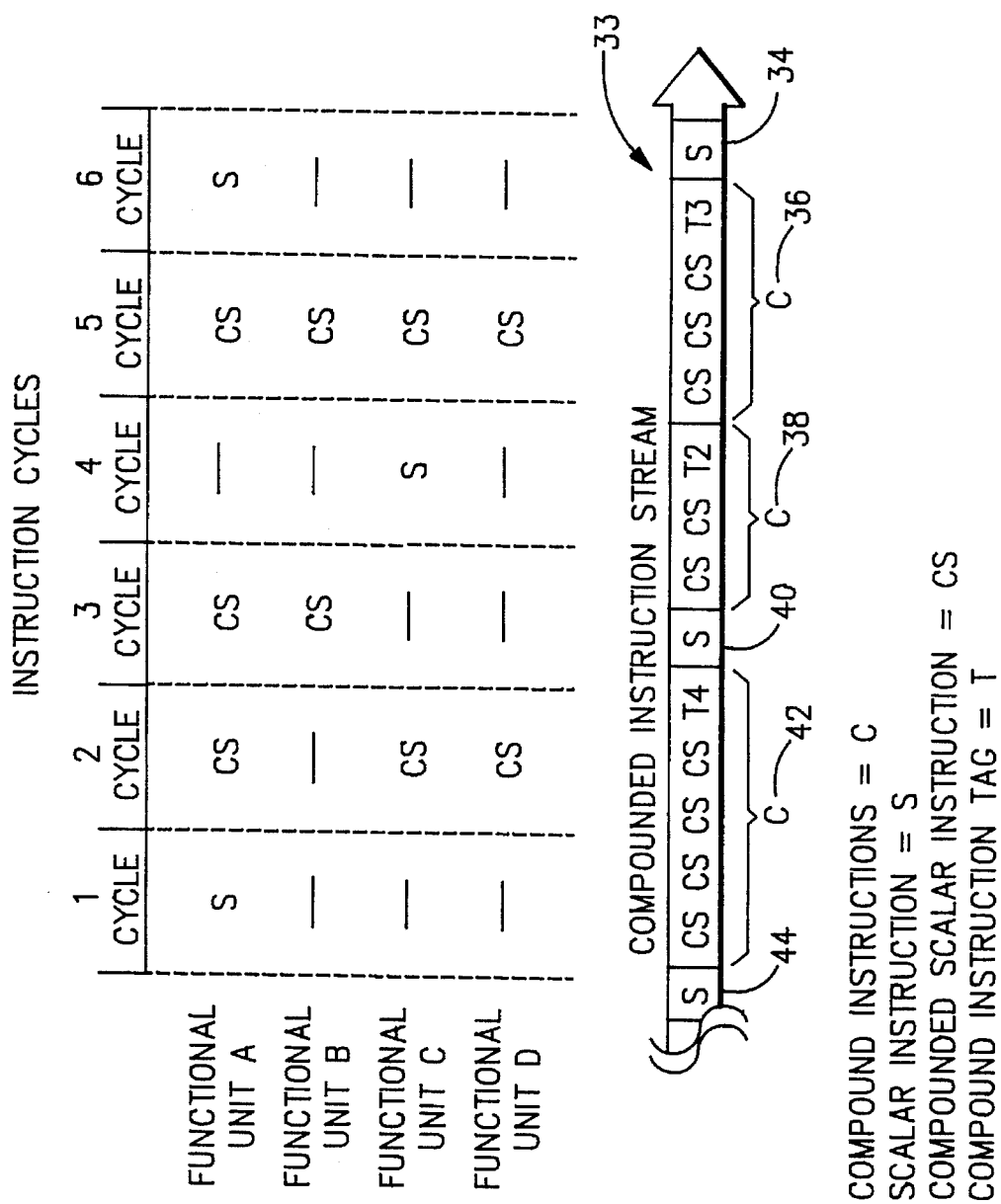
FIG. 2 is a timing diagram for a uniprocessor implementation showing the parallel execution of certain non-interlocked instructions which have been selectively grouped in a compound instruction stream.

As shown in FIG. 2, the invention can be implemented in a uniprocessor environment where each functional execution unit executes a scalar instruction (S) or alternatively a compounded scalar instruction (CS). As shown in the drawing, an instruction stream 33 containing a sequence of scalar and compounded scalar instructions has control tags (T) associated with each compound instruction. Thus, a first scalar instruction 34 could be executed singly by functional unit A in cycle 1; a triplet compound instruction 36 identified by tag T3 could have its three compounded scalar instructions executed in parallel by functional units A, C and D in cycle 2; another compound instruction 38 identified by tag T2 could have its pair of compounded scalar instructions executed in parallel by functional units A and B in cycle 3; a second scalar instruction 40 could be executed singly by functional unit C in cycle 4; a large group compound instruction 42 could have its four compounded scalar instructions executed in parallel by functional units A–D in cycle 5; and a third scalar instruction 44 could be executed singly by functional A in cycle 6.

Figure 3:
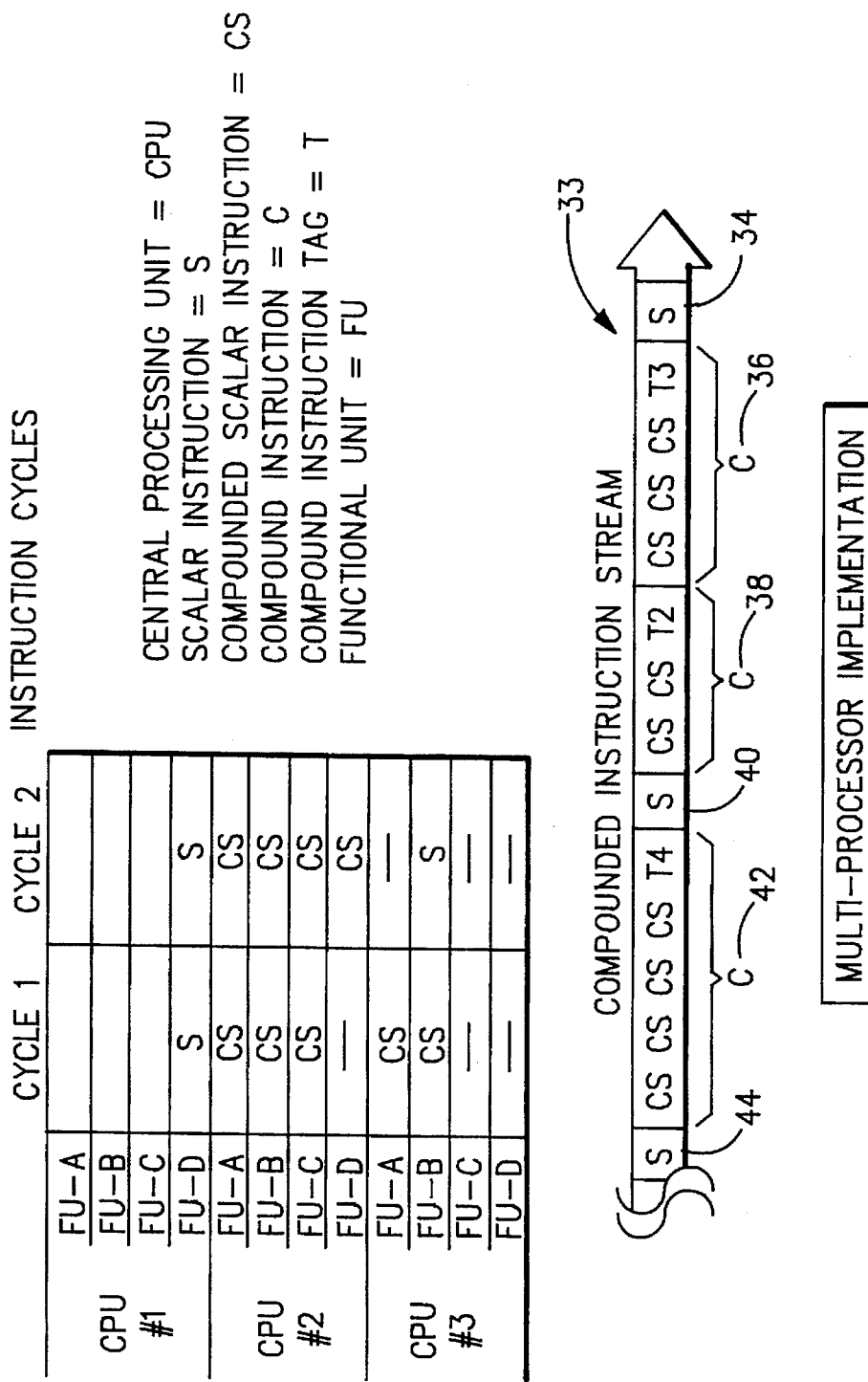
FIG. 3 is a timing diagram for a multiprocessor implementation showing the parallel execution of scalar and compound instructions which are not interlocked.

It is important to realize that multiple compound instructions are capable of parallel execution in certain computer system configurations. For example, the invention could be potentially implemented in a multiprocessor environment as shown in FIG. 3 where a compound instruction is treated as a unit for parallel processing by one of the CPUs (central processing units). As shown in the drawing, the same instruction stream 33 could be processed in only two cycles as follows. In a first cycle, a CPU #1 executes the first scalar instruction 34; the functional units of a CPU #2 execute triplet compound instruction 36; and the functional units of a CPU #3 execute the two compounded scalar instructions in compound instruction 38. In a second cycle, the CPU #1 executes the second scalar instruction 40; the functional units of CPU #2 execute the four compounded scalar instructions in compound instruction 42; and a functional unit of CPU #3 executes the third scalar instruction 44.

One example of a computer architecture which can be adapted for handling compound instructions is an IBM System/370 instruction level architecture in which multiple scalar instructions can be issued for execution in each machine cycle. In this context a machine cycle refers to all the pipeline steps or stages required to execute a scalar instruction. A scalar instruction operates on operands representing single-valued parameters. When an instruction stream is compounded, adjacent scalar instructions are selectively grouped for the purpose of concurrent or parallel execution.

The instruction sets for various IBM System/370 architectures such as System/370, the System/370 extended architecture (370-XA), and the System/370 Enterprise Systems Architecture (370-ESA) are well known. In that regard, reference is given here to the Principles of Operation of the IBM System/370 (publication #GA22-7000-10 1987), and to the Principles of Operation, IBM Enterprise Systems Architecture/370 (publication #SA22-7200-0 1988).

In general, an instruction compounding facility will look for classes of instructions that may be executed in parallel, and ensure that no interlocks between members of a compound instruction exist that cannot be handled by the hardware. When compatible sequences of instructions are found, a compound instruction is created.

More specifically, the System/370 instruction set can be broken into categories of instructions that may be executed in parallel in a particular computer system configuration. Instructions within certain of these categories may be combined or compounded with instructions in the same category or with instructions in certain other categories to form a compound instruction. For example, the System/370 instruction set can be partitioned into the categories illustrated in FIG. 4. The rationale for this categorization is based on the functional requirements of the System/370 instructions and their hardware utilization in a typical computer system configuration. The rest of the System/370 instructions are not considered specifically for compounding in this exemplary embodiment. This does not preclude them from being compounded by the technique of the present invention disclosed herein.

For example, consider the instructions contained in category 1 compounded with instructions from that same category in the following instruction sequence:

AR R1,R2

SR R3,R4

This sequence is free of data hazard interlocks and produces the following results which comprise two independent System/370 instructions:

R1=R1+R2

R3=R3−R4

Executing such a sequence would require two independent and parallel two-to-one ALU's designed to the instruction level architecture. Thus, it will be understood that these two instructions can be grouped to form a compound instructions in a computer system configuration which has two such ALU's. This example of compounding scalar instructions can be generalized to all instruction sequence pairs that are free of data dependent interlocks and also of hardware dependent interlocks.

In any actual instruction processor, there will be an upper limit to the number of individual instructions that can comprise a compound instruction. This upper limit must be specifically incorporated into the hardware and/or software unit which is creating the compound instructions, so that compound instructions will not contain more individual instructions (e.g., pair group, triplet group, group of four) that the maximum capability of the underlying execution hardware. This upper limit is strictly a consequence of the hardware implementation in a particular computer system configuration—it does not restrict either the total number of instructions that may be considered as candidates for compounding or the length of the group window in a given code sequence that may be analyzed for compounding. In general, the greater the length of a group window being analyzed for compounding, the greater the parallelism that can be achieved due to more advantageous compounding combinations.

Figure 5:
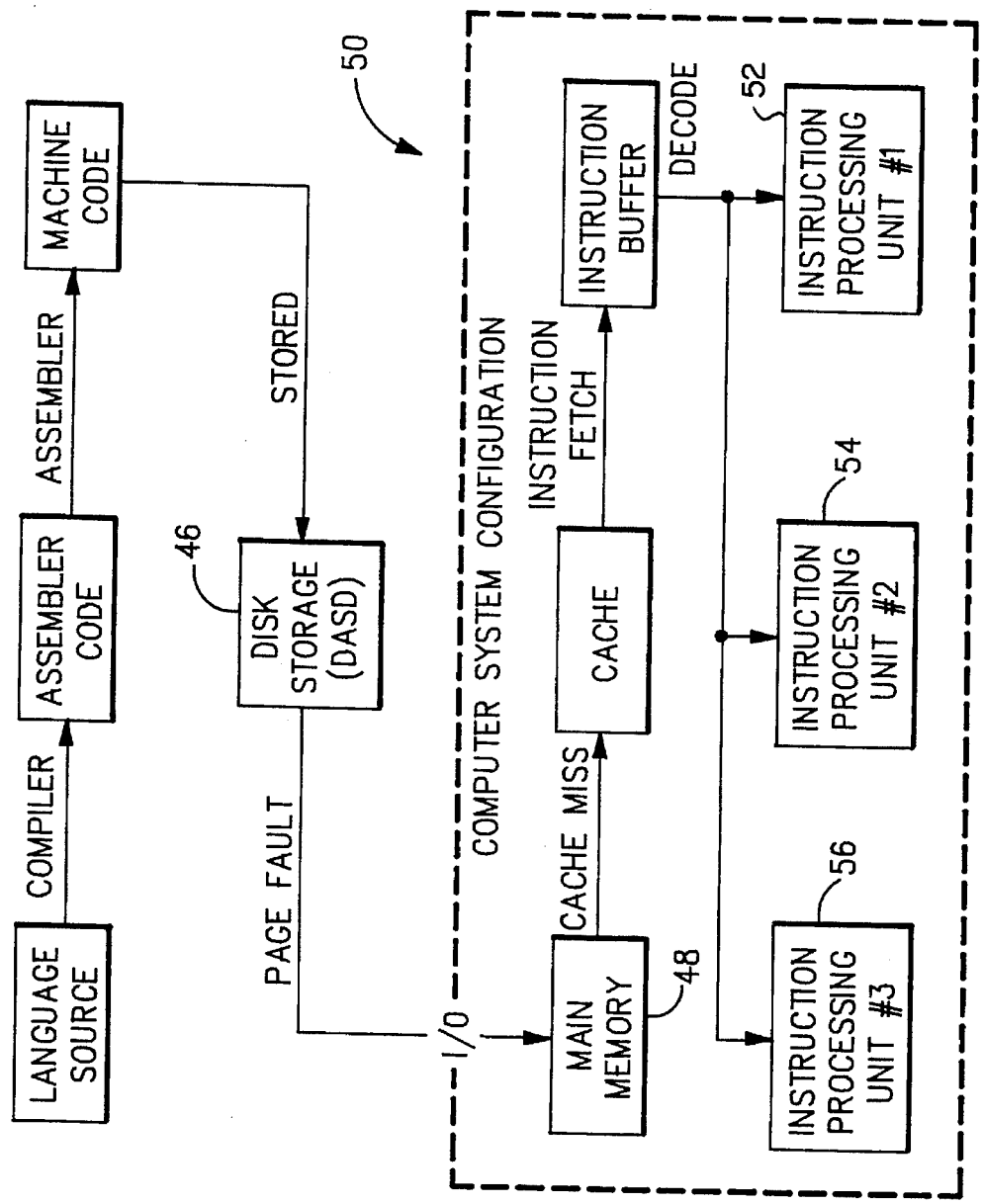
FIG. 5 shows a typical path taken by a program from source code to actual execution.

Referring to FIG. 5, there are many possible locations in a computer system where compounding may occur, both in software and in hardware. Each has unique advantages and disadvantages. As shown in FIG. 5, there are various stages that a program typically takes from source code to actual execution. During the compilation phase, a source program is translated into machine code and stored on a disk 46. During the execution phase the program is read from the disk 46 and loaded into a main memory 48 of a particular computer system configuration 50 where the instructions are executed by appropriate instruction processing units 52, 54, 56. Compounding could take place anywhere along this path. In general as the compounder is located closer to an instruction processing unit or CPUs, the time constraints become more stringent. As the compounder is located further from the CPU, more instructions can be examined in a large sized instruction stream window to determine the best grouping for compounding for increasing execution performance. However such early compounding tends to have more of an impact on the rest of the system design in terms of additional development and cost requirements.

Figure 6:
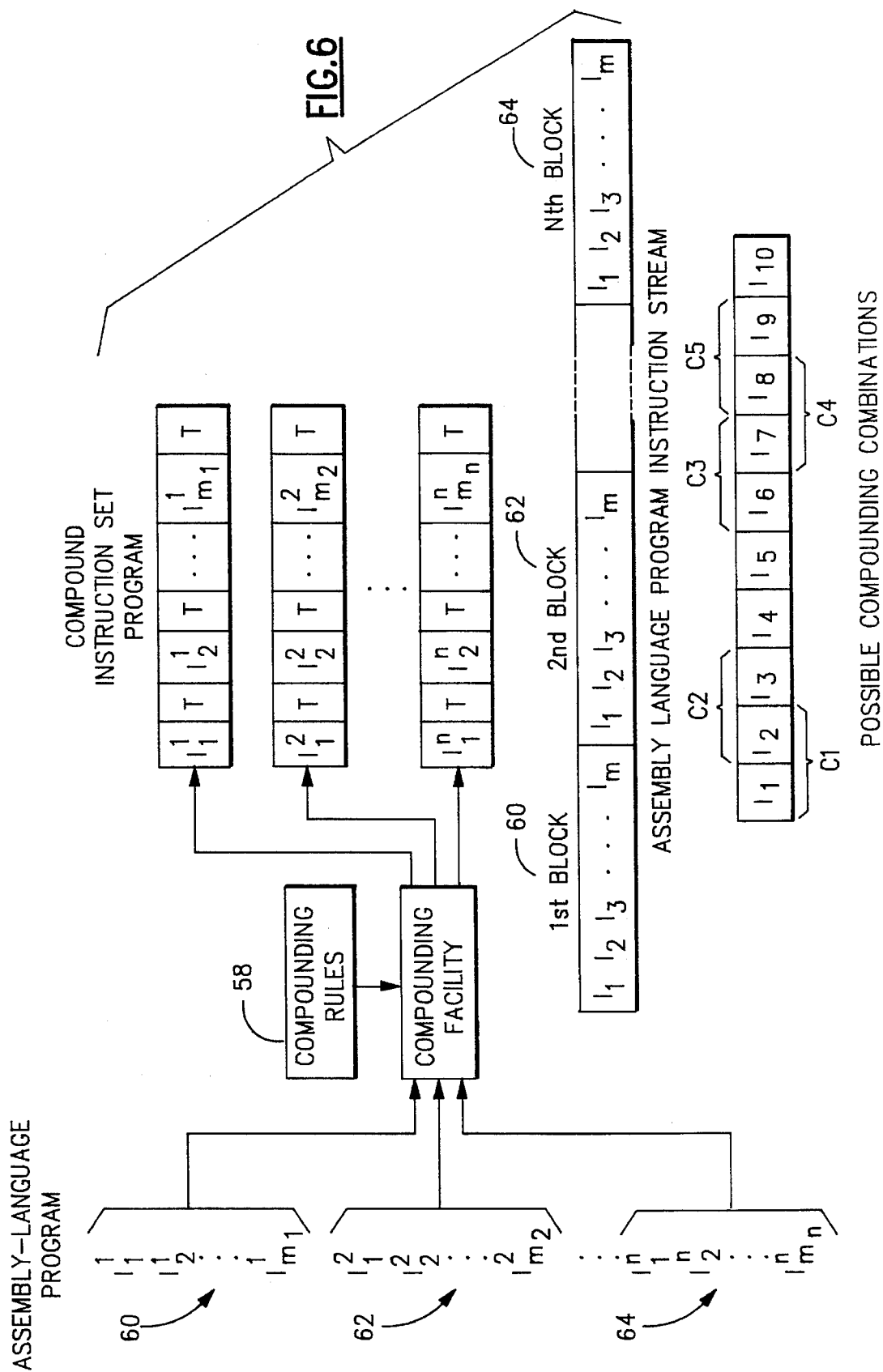
FIG. 6 is a flow diagram showing generation of a compound instruction set program from an assembly language program.

The flow diagram of FIG. 6 shows the generation of a compound instruction set program from an assembly language program in accordance with a set of customized compounding rules 58 which reflect both the system and hardware architecture. The assembly language program is provided as an input to a software compounding facility 59 that produces the compound instruction program. Successive blocks of instructions having a predetermined length are analyzed by the software compounding facility 59. The length of each block 60, 62, 64 in the byte stream which contains the group of instructions considered together for compounding is dependent on the complexity of the compounding facility.

As shown in FIG. 6, this particular compounding facility is designed to consider two-way compounding for "m" number of fixed length instructions in each block. The primary first step is to consider if the first and second instructions constitute a compoundable pair, and then if the second and third constitute a compoundable pair, and then if the third and fourth constitute a compoundable pair, all the way to the end of the block. Once the various possible compoundable pairs C1–C5 have been identified, the compounding facility can select the preferred sequence of compounded instructions and use flags or identifier bits to identify the optimum sequence of compound instructions.

Figure 14:
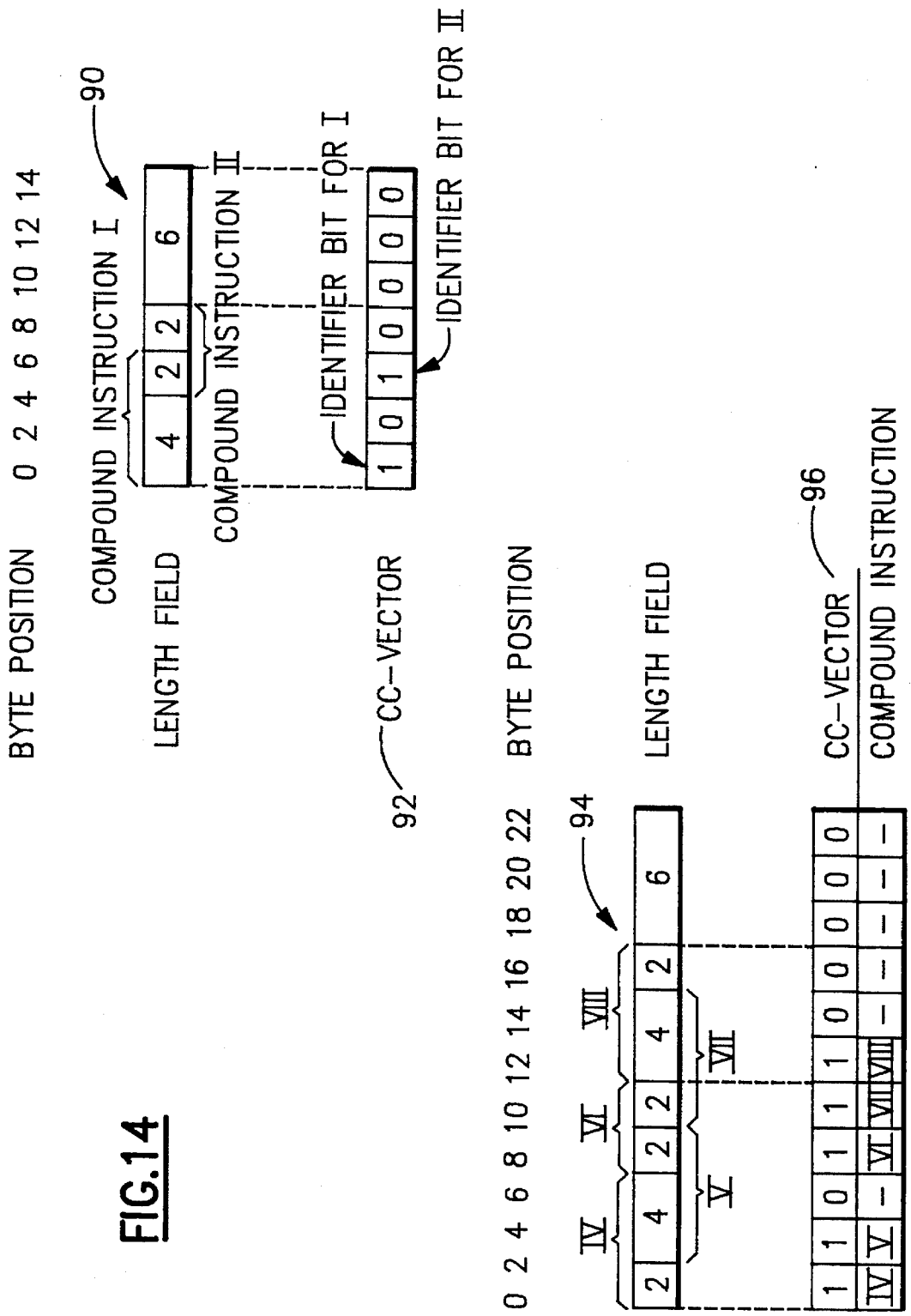
FIG. 14 shows how different groupings of valid non-interlocked pairs of instructions form multiple compound instructions for sequential or branch target execution.

If there is no optimum sequence, all of the compoundable adjacent scalar instructions can be identified so that a branch to a target located amongst various compound instructions can exploit any of the compounded pairs which are encountered (See FIG. 14). Where multiple compounding units are available, multiple successive blocks in the instruction stream could be compounded at the same time.

Of course it is easier to pre-process an instruction stream for the purpose of creating compound instructions if known reference points already exist to indicate where instructions begin. As used herein, a reference point means knowledge of which byte of text is the first byte in an instruction. This knowledge could be obtained by some marking field or other indicator which provides information about the location of instruction boundaries. In many computer systems such a reference point is expressly known only by the compiler at compile time and only by the CPU when instructions are fetched. Such a reference point is unknown between compile time and instruction fetch unless a special reference tagging scheme is adopted.

Figure 7:
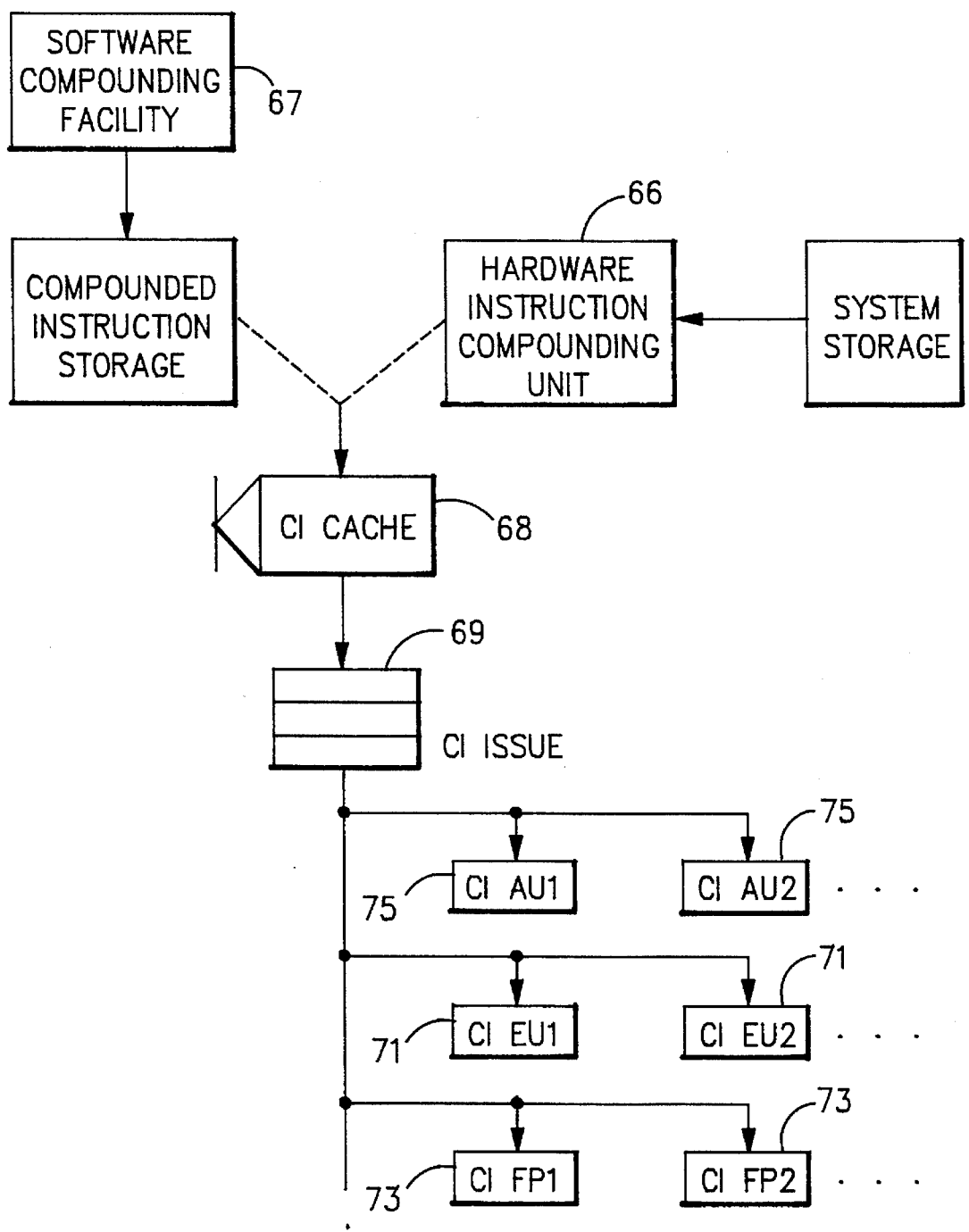
FIG. 7 is a flow diagram showing execution of a compound instruction set program.

The flow diagram of FIG. 7 shows the execution of a compound instruction set program which has been generated by a hardware preprocessor 66 or a software proprocessor 67. A byte stream having compound instructions flows into a compound instruction (CI) cache 68 that serves as a storage buffer providing fast access to compound instructions. CI issue logic 69 fetches compound instructions from the CI Cache and issues their individual compounded instructions to the appropriate functional units for parallel execution.

It is to be emphasized that instruction execution units (CI EU) 71 such as ALU's in a compound instruction computer system are capable of executing either scalar instructions one at a time by themselves or alternatively compounded scalar instructions in parallel with other compounded scalar instructions. Also, such parallel execution can be done in different types of execution units such as ALU's, floating point (FP) units 73, storage address-generation units (AU) 75 or in a plurality of the same type of units (FP1, FP2, etc) in accordance with the computer architecture and the specific computer system configuration.

When compounding is done after compile time, a compiler could indicate with tags which bytes contain the first byte of an instruction and which contain data. This extra information results in a more efficient compounder since exact instruction locations are known. Of course, the compiler could differentiate between instructions and data in other ways in order to provide the compounder with specific information indicating instruction boundaries.

In the exemplary two-way compounding embodiment of this application, compounding information is added to the instruction stream as one bit for every two bytes of text (instructions and data). In general, a tag containing control information can be added to each instruction in the compounded byte stream—that is, to each non-compounded scalar instruction as well as to each compounded scalar instruction included in a pair, triplet, or larger compounded group. As used herein, identifier bits refers to that part of the tag used specifically to identify and differentiate those compounded scalar instructions forming a compounded group from the remaining non-compounded scalar instructions. Such non-compounded scalar instructions remain in the compound instruction program and when fetched are executed singly.

In a system with all 4-byte instructions aligned on a four byte boundary, one tag is associated with each four bytes of text. Similarly, if instructions can be aligned arbitrarily, a tag is needed for every byte of text.

The case of compounding at most two instructions provides the smallest grouping of scalar instructions to form a compound instruction, and uses the following preferred encoding procedure for the identifier bits. Since all System/370 instructions are aligned on a halfword (two-byte) boundary with lengths of either two or four or six bytes, one tag with identifier bits is needed for every halfword. In this small grouping example, an identifier bit "1" indicates that the instruction that begins in the byte under consideration is compounded with the following instruction, while a "0" indicates that the instruction that begins in the byte under consideration is not compounded. The identifier bit associated with halfwords that do not contain the first byte of an instruction is ignored. The identifier bit for the first byte of the second instruction in a compounded pair is also ignored. As a result, this encoding procedure for identifier bits means that in the simplest case only one bit of information is needed by a CPU during execution to identify a compounded instruction.

Where more than two scalar instructions can be grouped together to form a compound instruction, additional identifier bits may be required. The minimum number of identifier bits needed to indicate the specific number of scalar instructions actually compounded is the logarithm to the base 2 (rounded up to the nearest whole number) of the maximum number of scalar instructions that can be grouped to form a compound instruction. For example, if the maximum is two, then one identifier bit is needed for each compound instruction. If the maximum is three or four, then two identifier bits are needed for each compound instruction. If the maximum is five, six, seven or eight, then three identifier bits are needed for each compound instruction. This encoding scheme is shown below in Table 1:

TABLE 1

| Identifier Bits | Encoded meaning | Total # Compounded |
| --- | --- | --- |
| 00 | This instruction is not compounded with its following instruction | none |
| 01 | This instruction is compounded with its one following instruction | two |
| 10 | This instruction is compounded with its two following instructions | three |
| 11 | This instruction is compounded with its three following instructions | four |

It will therefore be understood that each halfword needs a tag, but the CPU ignores all but the tag for the first instruction in the instruction stream being executed. In other words, a byte is examined to determine if it is a compound instruction by checking its identifier bits. If it is not the beginning of a compound instruction, its identifier bits are zero. If the byte is the beginning of a compound instruction containing two scalar instructions, the identifier bits are "1" for the first instruction and "0" for the second instruction. If the byte is the beginning of a compound instruction containing three scalar instructions, the identifier bits are "2" for the first instruction and "1" for the second instruction and "0" for the third instruction. In other words, the identifier bits for each half word identify whether or not this particular byte is the beginning of a compound instruction while at the same time indicating the number of instructions which make up the compounded group.

This method of encoding compound instructions assumes that if three instructions are compounded to form a triplet group, the second and third instructions are also compounded to form a pair group. In other words, if a branch to the second instruction in a triplet group occurs, the identifier bit "1" for the second instruction indicates that the second and third instruction will execute as a compounded pair in parallel, even though the first instruction in the triplet group was not executed.

It will be apparent to those skilled in the art that the present invention requires an instruction stream to be compounded only once for a particular computer system configuration, and thereafter any fetch of compounded instructions will also cause a fetch of the identifier bits associated therewith. This avoids the need for the inefficient last-minute determination and selection of certain scalar instructions for parallel execution that repeatedly occurs every time the same or different instructions are fetched for execution in the so-called super scalar machine.

Despite all of the advantages of compounding a binary instruction stream, it becomes difficult to do so under certain computer architectures unless a technique is developed for determining instruction boundaries in a byte string. Such a determination is complicated when variable length instructions are allowed, and is further complicated when data and instructions can be intermixed. Of course, at execution time instruction boundaries must be known to allow proper execution. But since compounding is preferably done a sufficient time prior to instruction execution, a technique is needed to compound instructions without knowledge of where instructions start and without knowledge of which bytes are data. This technique needs to be applicable to all of the accepted types of architectures, including the RISC (Reduced Instruction Set Computers) architectures in which instructions are usually a constant length and are not intermixed with data.

There are a number of variations of the technique of the present invention, depending on the information that is already available about the particular instruction stream being compounded. The various combinations of typical pertinent information are shown below in Table 2:

TABLE 2

| | Byte String Information | | |
|---|---|---|---|
| Case | Instruction Length | Data Intermixed | Reference Point |
| A | fixed | no | yes |
| B | variable | no | yes |
| C | fixed or variable | yes | yes |
| D | fixed | no | no |
| E | variable | no | no |
| F | fixed | yes | no |
| G | variable | yes | no |

It is to be noted that in some instances fixed and variable length instructions are identified as being different cases. This is done because the existence of variable length instructions creates more uncertainty where no reference point is known, thereby resulting in the creation of many more potential compounding bits. In other words, when generating the potential instruction sequences as provided by the technique of this invention, there are no compounding identifier tags for bytes in the middle of any fixed length instructions. Also, the total number of identifier tags required under the preferred encoding scheme is fewer (i.e., one identifier tag for every four bytes for instructions having a fixed length of four bytes). Nevertheless, the unique technique of this invention works equally well with either fixed or variable length instructions since once the start of an instruction is known (or presumed), the length can always be found in one way or another somewhere in the instructions. In the System/370 instructions, the length is encoded in the opcode, while in other systems the length is encoded in the operands.

In case A with fixed length instructions having no data intermixed and with a known reference point location for the opcode, the compounding can proceed in accordance with the applicable rules for that particular computer configuration. Since the length is fixed, a sequence of scalar instructions is readily determined, and each instruction in the sequence can be considered as possible candidates for parallel execution with a following instruction. A first encoded value in the control tag indicates the instruction is not compoundable with the next instruction, while a second encoded value in the control tag indicates the instruction is compoundable for parallel execution with the next instruction.

Figures 8, 13:
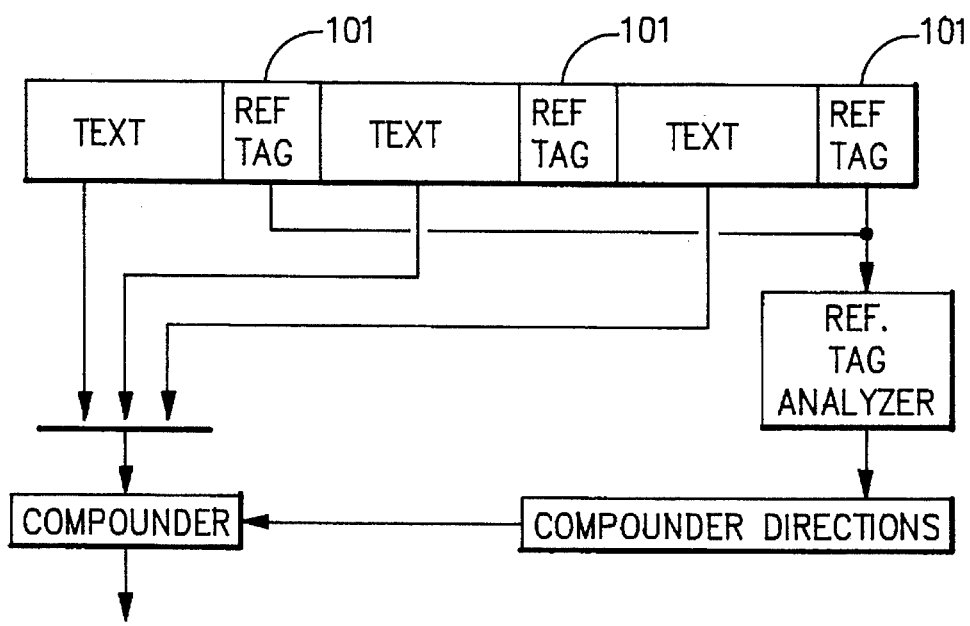
FIGS. 8 is an analytical chart for instruction stream texts with identifiable instruction reference points.
FIG. 13 is a flow diagram for compounding an instruction stream having tags to identify instruction boundary reference points.

Similarly in case B with variable length instructions having no data intermixed, and with a known reference point for the instructions (and therefore also for the instruction length code, the compounding can proceed in a routine manner. As shown in FIG. 8, the opcodes indicate an instruction sequence 70 as follows: the first instruction is 6 bytes long, the second and third are each 2 bytes long, the fourth is 4 bytes long, the fifth is 2 bytes long, the sixth is 6 bytes long, and the seventh and eighth are each 2 bytes long.

Figure 12:
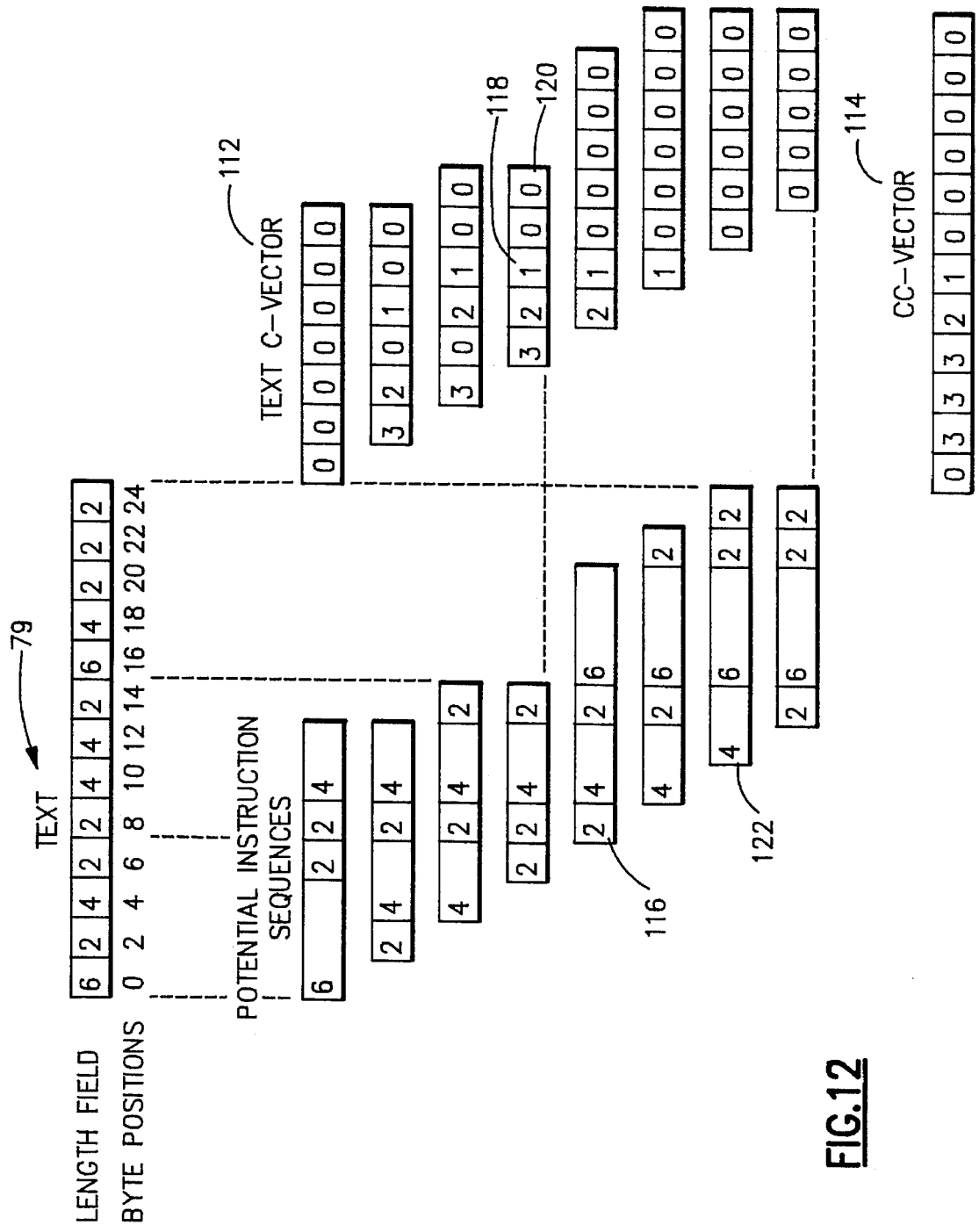
FIG. 12 is an analytical chart for the worst case instruction text of FIG. 10, showing the sets of possible compound identifier bits for grouping up to four scalar instructions to form each compound instruction.

For purposes of illustration, the technique for compounding herein is shown for creating compound instructions formed from adjacent pairs of scalar instructions (FIGS. 8–10) as well as for creating compound instructions formed from larger groups of scalar instructions (FIG. 12). The exemplary rules for the embodiments shown in the drawings are additionally defined to provide that all instructions which are 2 bytes or 4 bytes long are compoundable with each other (i.e., a 2 byte instruction is capable of parallel execution in this particular computer configuration with another 2 byte or another 4 byte instruction). The rules further provide that all instructions which are 6 bytes long are not compoundable at all (i.e., a 6 byte instruction is only capable of execution singly by itself in this particular computer configuration). Of course, the invention is not limited to these exemplary compound rules, but is applicable to any set of compounding rules which define the criteria for parallel execution of existing instructions in a specific configuration for a given computer architecture.

The instruction set used in these exemplary compounding techniques of the invention is taken from the System/370 architecture. By examining the opcode for each instruction, the type and length of each instruction can be determined and the control tag containing identifier bits is then generated for that specific instruction, as described in more detail hereinafter. Of course, the present invention is not limited to any specific architecture or instruction set, and the aforementioned compounding rules are by way of example only.

The preferred encoding for compound instructions in these illustrated embodiments is now described. If two adjacent instructions can be compounded, their identifier bits which are generated for storage are "1" for the first compounded instruction and "0" for the second compounded instruction. However, if the first and second instructions cannot be compounded, the identifier bit for the first instruction is "0" and the second and third instruction are then considered for compounding. Once an instruction byte stream has been pre-processed in accordance with this technique and identifier bits encoded for the various scalar instructions, more optimum results for achieving parallel execution may be obtained by using a bigger window for looking at larger groups, and then picking the best combination of adjacent pairs for compounding.

A C-vector 72 in FIG. 8 shows the values for the identifier bits (called compounding bits in the drawings) for this particular sequence 70 of instructions where a reference point indicating the beginning of the first instruction is known. Based on the values of such identifier bits, the second and third instructions form a compounded pair as indicated by the "1" in the identifier bit for the second instruction. The fourth and fifth instructions form another compounded pair as indicated by the "1" in the identifier bit for the fourth instruction. The seventh and eighth instructions also form a compounded pair as indicated by the "1" in the identifier bit for the seventh instruction.

The C-vector 72 of FIG. 8 is also relatively easy to generate in case B when there are no data bytes intermixed with the instruction bytes, and where the instructions are all of the same length with known boundaries.

A slightly more complex situation is presented in case C where instructions are mixed with non-instructions, with a reference point still being provided to indicate the beginning of an instruction. The schematic diagram of FIG. 13 shows one way of indicating an instruction reference point, where every halfword has been flagged with a tag to indicate whether or not it contains the first byte of an instruction. This could occur with both fixed length and variable length instructions. By providing the reference point, it is unnecessary to evaluate the data portion of the byte stream for possible compounding. Accordingly, the compounding unit can skip over and ignore all of the non-instruction bytes.

Case D does not present a difficult problem with fixed length instructions having no data intermixed, since the instructions and data are typically aligned on predetermined byte boundaries. So although the table shows that the reference point is not known, in fact it is readily determined based on the alignment requirements.

Figure 9:
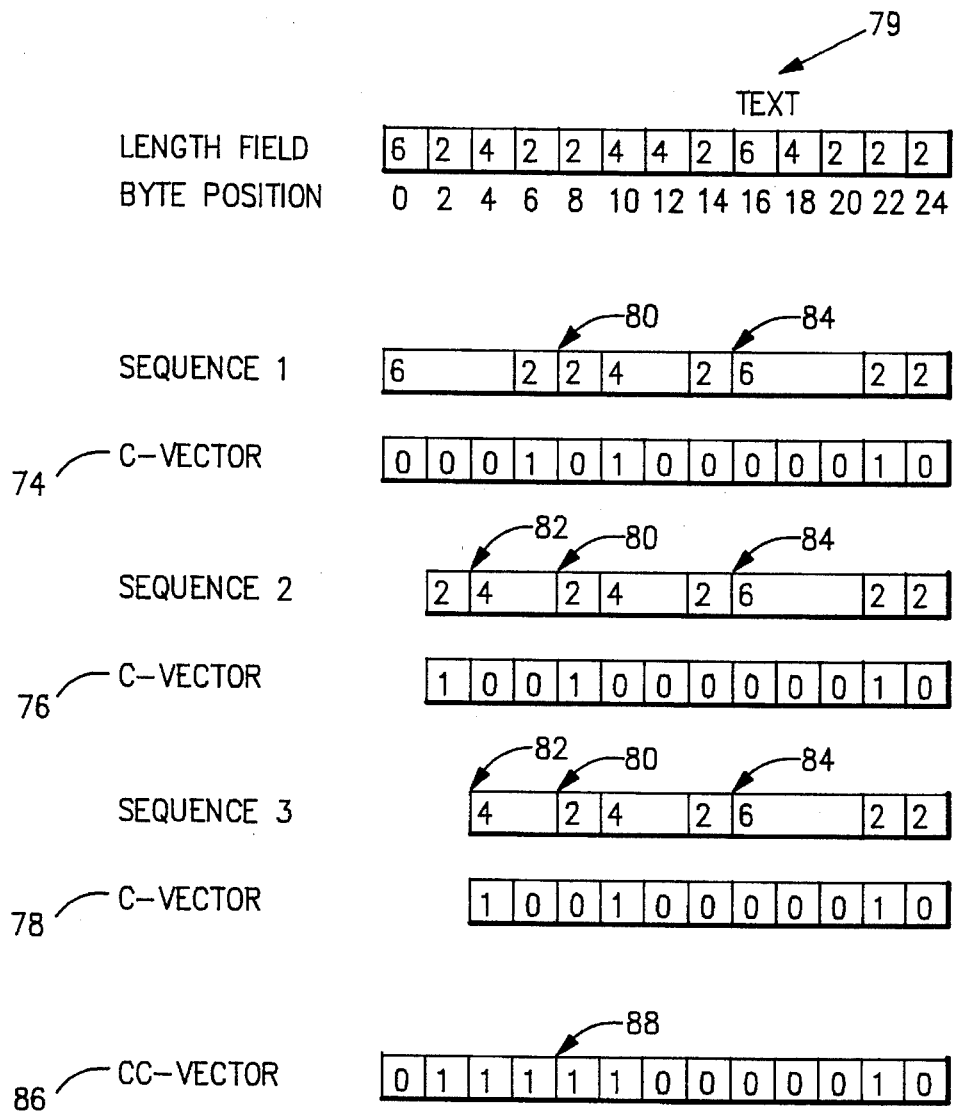
FIG. 9 is an analytical chart for an instruction stream text with variable length instructions without a reference point, showing their related sets of possible compound identifier bits.

Case E is a more complicated situation where a byte stream includes variable length instructions (without data), but it is not known where a first instruction begins. Since the maximum length instruction is six bytes, and since instructions are aligned on two byte boundaries, there are three possible starting points for the first instruction the the stream. Accordingly, the invention provides for considering all possible starting points for the first instruction in the text of a byte stream 79, as shown in FIG. 9.

Sequence 1 assumes that the first instruction starts with the first byte, and proceeds with compounding on that premise. The value in the length field for the first byte is 6 indicating the next instruction begins with the seventh byte; the value in the length field for the seventh byte is 2 indicating the next instruction begins with the ninth byte; the value in the length field for the ninth byte is 2 indicating the next instruction begins with the eleventh byte; the value in the length field for the eleventh byte is 4 indicating the next instruction begins with the fifteenth byte; the value in the length field for the fifteenth byte is 2 indicating the next instruction begins with the seventeenth byte; the value in the length field for the seventeenth byte is 6 indicating the next instruction begins with the twenty third byte; the value in the length field for the twenty third byte is 2 indicating the next instruction begins with the twenty fifth byte; and the value in the length field for the twenty fifth byte is 2 indicating the next instruction (not shown) begins with the twenty seventh byte.

In this exemplary embodiment, the length field is also determinative of the C-vector value for each possible instruction. Therefore a C-vector 74 for Sequence 1 only has a "1" value for the first instruction of a possible compounded pair formed by combinations of 2 byte and 4 byte instructions.

Sequence 2 assumes that the first instruction starts at the third byte (the beginning of the second halfword), and proceeds on that premise. The value in the length field for the third byte is 2 indicating the next instruction begins with the fifth byte. By proceeding through each possible instruction based on the length field value in the preceding instruction, the entire potential instructions of Sequence 2 are generated along with the possible identifier bits as shown in a C-vector 76.

Sequence 3 assumes that the first instruction starts at the fifth byte (the beginning of the third halfword), and proceeds on that premise. The value in the length field for the fifth byte is 4 indicating the next instruction begins with the ninth byte. By proceeding through each possible instruction based on the length field value in the preceding instruction, the entire potential instructions of Sequence 3 are generated along with the possible identifier bits as shown in a C-vector 78.

In some instances the three different Sequences of potential instructions will converge into one unique sequence. The rate of convergence depends on the specific bits which are in the potential opcode field reserved for the instruction length. In some instruction byte streams there will be no convergence found during compounding of a particular window (for example, a sequence of instructions in which all the lengths happen to be four bytes). In other instances, convergence to the same instruction boundaries could occur with the compounding sequence of two different sequences out-of-phase. However, out-of-phase convergence is always corrected by the next non-compoundable instruction, if not earlier.

In FIG. 9 it is noted that the three Sequences converge on instruction boundaries at the end 80 of the eighth byte It is also noted that if additional sequences started at the end of the sixth, eighth and tenth bytes, they would also converge quickly. Sequences 2 and 3, while converging on instruction boundaries at the end 82 of the fourth byte, are out-of-phase in compounding until the end of the sixteenth byte. In other words, the two sequences consider different pairs of instructions based on the same sequence of instructions. Since the seventeenth byte begins a non-compoundable instruction at 84, the out-of-phase convergence is ended. In a situation where each window of instructions being reviewed contains more than two instructions, the various sequences might have converged sooner because the two instruction compounders might have chosen the same optimum pairings.

When no valid convergence occurs, it is necessary to continue all three possible instruction sequences to the end of the window. However, where valid convergence occurs and is detected, the number of sequences collapses from three to two (one of the identical sequences becomes inoperative), and in some instances from two to one. Where multiple sequences of instructions must be considered due to the unknown instruction boundaries, the rate of compounding will be slower than the compounding of FIG. 8 by a factor equal to the number of active sequences (assuming a single unit compounding facility). If convergence is fast, the rate of compounding exemplified in FIGS. 8 and 9 will be virtually equivalent.

Thus, prior to convergence, tentative instruction boundaries are determined for each possible instruction sequence and identifier bits assigned for each such instruction indicating the location of the potential compound instructions. It is apparent from FIG. 9 that this technique generates three separate identifier bits for every two text bytes. In order to provide consistency with the pre-processing done in cases A–D, it is desirable to reduce the three possible sequences to a single sequence of identifier bits where only one bit is associated with each halfword. Since the only information needed is whether the current instruction is compounded with the following instruction, the three bits can be logically ORed to produce a single sequence in a CC-vector 86.

Figure 16B:
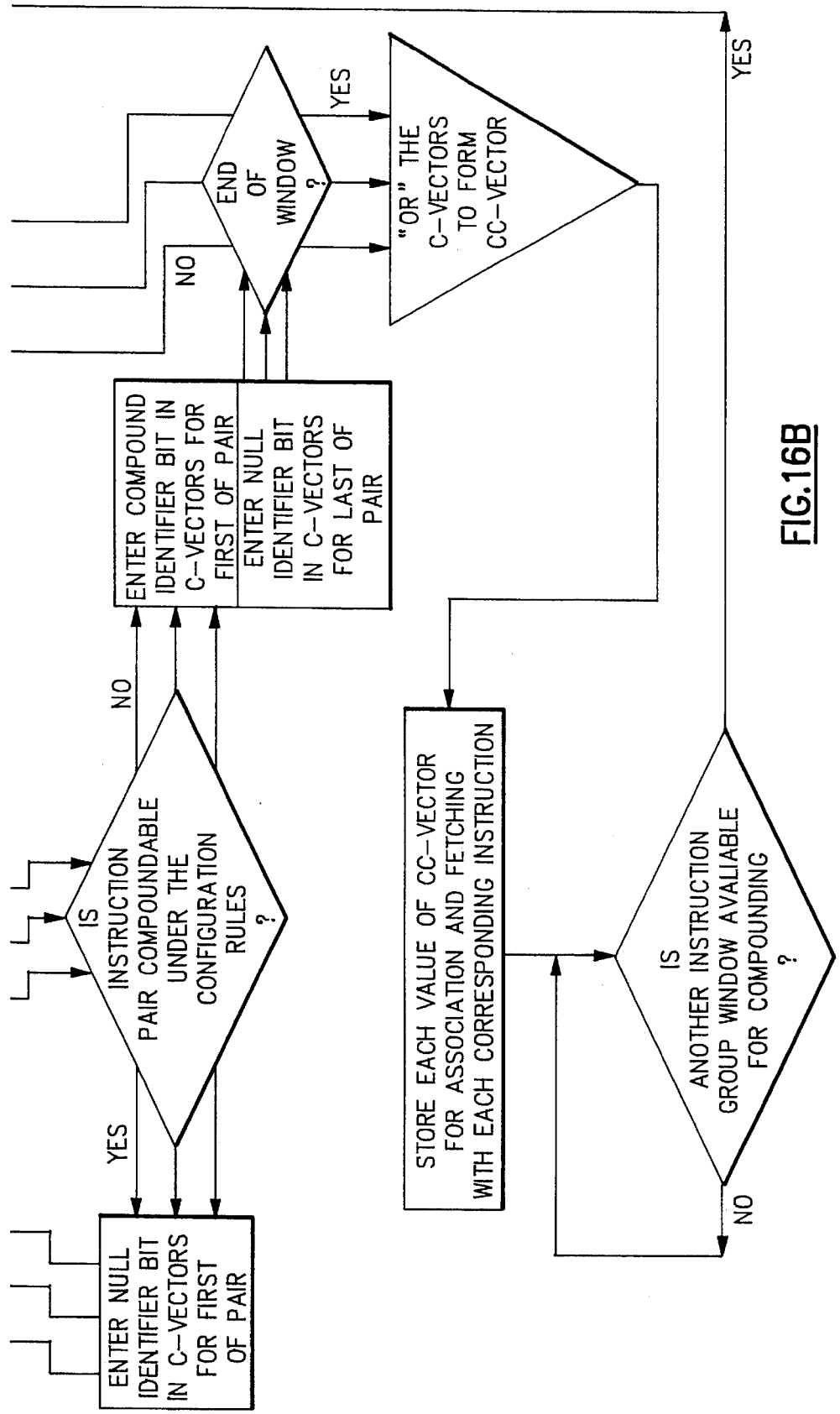
FIG. 16 (FIG. 16 comprising FIGS. 16A and 16B) is a flow chart for compounding an instruction stream like the one shown in FIG. 9.

The various steps in the compounding method shown in FIG. 9 as described above are illustrated in the flow chart of FIG. 16.

For purposes of parallel execution, the composite identifier bits of a composite CC-vector are equivalent to the separate C-vectors of the individual three Sequences 1–3. This can be shown by referring to the CC-vector 86 in FIG. 9. Proceeding with Sequence 1, if the first byte is considered for execution either because of conventional sequential processing or by branching, the instruction is fetched along with its associated identifier bits. Since the identifier bit is "0", the first instruction is executed serially as a single instruction. The identifier bits associated with the third and fifth bytes are ignored. The next instruction in Sequence 1 begins at the seventh byte, so such instruction is fetched by the CPU along with its identifier bit which is "1". Since this indicates the beginning of a compound instruction, the next instruction is also fetched (its identifier bit "1" in the CC-vector 86 is ignored, so the fact that its identifier bit in the C-vector 74 is different is of no consequence) for parallel execution with the instruction which begins at the seventh byte. So the CC-vector 86 works satisfactorily for Sequence 1 if it turns out to be an actual instruction sequence.

Proceeding with Sequence 2, if the third byte is considered for execution either because of conventional sequential processing or by branching, the instruction is fetched along with its associated identifier bits. Since the identifier bit is "1" and indicates the beginning of a compound instruction, the next instruction is also fetched (its identifier bit "1" in the CC-vector 86 is ignored, so the fact that its identifier bit in the C-vector 76 is different is of no consequence) for parallel execution with the instruction which begins at the third byte. So the CC-vector 86 also works satisfactorily for Sequence 2 if it turns out to be an actual instruction sequence.

Proceeding with Sequence 3, if the fifth byte is considered for execution either because of conventional sequential processing or by branching, the instruction is fetched along with its associated identifier bits. Since the identifier bit is "1" and indicates the beginning of a compound instruction, the next instruction is also fetched (its identifier bit "1" in the CC-vector 86 is ignored, so the fact that its identifier bit in the C-vector 78 is different is of no consequence) for parallel execution with the instruction which begins at the fifth byte. So the CC-vector also works satisfactorily for Sequence 3 if it turns out to be an actual instruction sequence.

Thus the composite identifier bits in the CC-vector allow any of the three possible sequences to execute properly in parallel for compound instructions or singly for non-compounded instructions. The composite identifier bits also work properly for branching. For example, if a branch to the beginning 88 of the ninth byte occurs, then the ninth byte must begin an instruction. Otherwise there is an error in the program. The identifier bit "1" associated with the ninth byte is used and correct parallel execution of such instruction with its next instruction proceeds.

Figure 15:
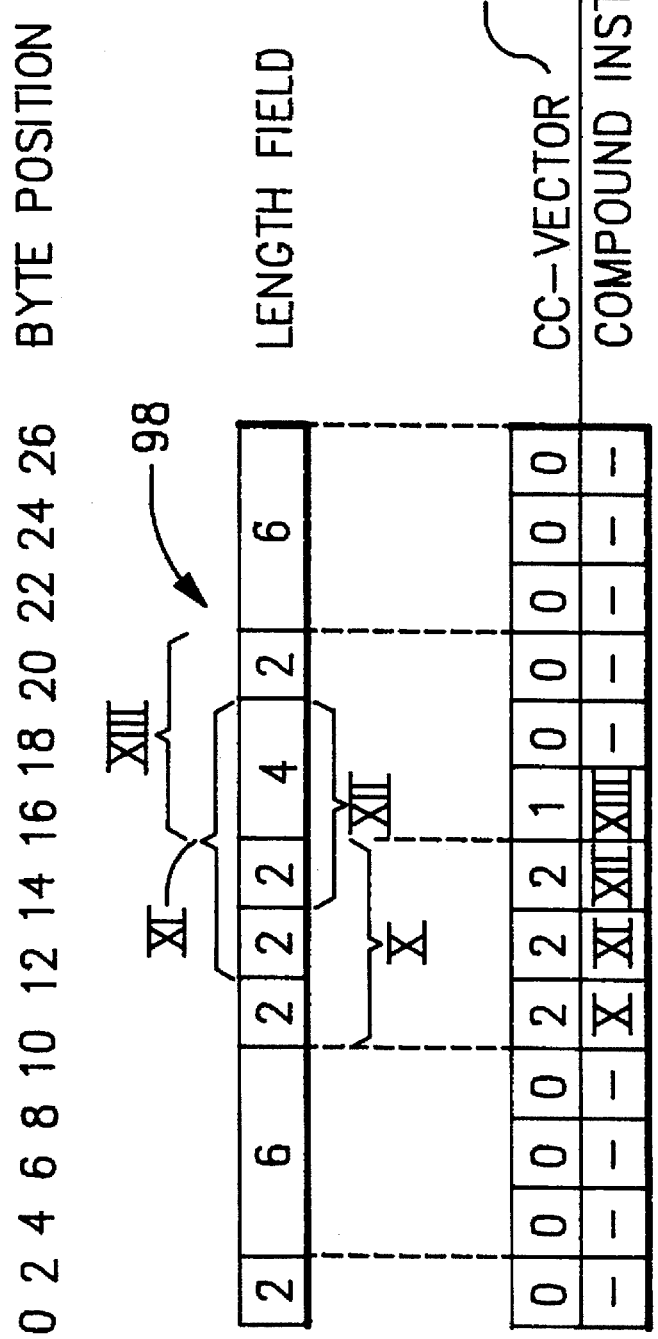
FIG. 15 shows how different groupings of valid non-interlocked triplets of instructions form multiple compound instructions for sequential or branch target execution.

One beneficial advantage provided by the composite identifier bits in the CC-vector is the creation of multiple valid compounding bit sequences based on which instruction is addressed by a branch target. As best shown in FIGS. 14–15, differently formed compounded instructions are possible from the same byte stream.

FIG. 14 shows the possible combinations of compounded instructions when the computer configuration provides for parallel issuance and execution of no more than two instructions. Where an instruction stream 90 containing compounded instructions is processed in normal sequence, the Compound Instruction I will be issued for parallel execution based on decoding of the identifier bit for the first byte in a CC-vector 92. However, if a branch to the fifth byte occurs, the Compound Instruction II will be issued for parallel execution based on decoding of the identifier bit for the fifth byte.

Similarly, a normal sequential processing of another compounded byte stream 94 will result in Compound Instructions IV, VI and VIII being sequentially executed (the component instructions in each compound instruction being executed in parallel). In contrast, branching to the third byte in the compounded byte stream will result in Compound Instructions V and VII being sequentially executed, and the instruction beginning at the fifteenth byte (it forms the second part of Compound Instruction VIII) will be issued and executed singly, all based in the identifier bits in the CC-vector 96.

Branching to the seventh byte will result in Compound Instructions VI and VIII being sequentially executed, and branching to the eleventh byte will result in Compound Instruction VIII being executed. In contrast, branching to the ninth byte in the compounded byte stream will result in Compound Instruction VII being executed (it is formed by the second part of Compound Instruction VI and the first part of Compound Instruction VIII).

Thus, the identifier bits "1" in the CC-vector 96 for Compound Instructions IV, VI and VIII are ignored when either of the Compound Instructions V or VII is being executed. Alternatively the identifier bits "1" in the CC-vector 96 for Compound Instructions V and VII are ignored when any of Compound Instructions IV, VI or VIII are executed.

FIG. 15 shows the possible combinations of compounded instructions when the computer configuration provides for parallel issuance and execution of up to three instructions. Where an instruction stream 98 containing compounded instructions is processed in normal sequence, the Compound Instructions X (a triplet group) and XIII (a pair group) will be executed. In contrast, branching to the eleventh byte will result in Compound Instruction XI (a triplet group) being executed, and branching to the thirteenth byte will result in Compound Instruction XII (a different triplet group) being executed.

Thus, the identifier bits "2" in a CC-vector 99 for Compound Instructions XI and XII are ignored when Compound Instructions X and XIII are executed. On the other hand when Compound Instruction XI is executed, the identifier bits for the other three Compound Instructions X, XII, XII are ignored. Similarly when Compound Instruction XII is executed, the identifier bits for the other three Compound Instructions X, XI, XIII are ignored.

Case G is the most complex case which deals with an instruction stream having data intermixed with variable length instructions, without any known reference point for the beginning of any instruction. This could occur when compounding a page in memory or in an instruction cache when a reference point is not known. The first embodiment (not shown) for dealing with Case G is identical to the one used for Case E, but there is an additional distinction because of the fact that data is intermixed with the instructions. If convergence occurs, a new sequence must always be started in place of each sequence eliminated by convergence. This is because convergence could occur in a byte containing data; consequently all three compounding sequences could converge to a spurious sequence of "instructions" which are in fact not instructions at all. This would eventually be corrected when a sequence of real instructions is encountered by one of the sequences. But in the meantime some compoundable instructions might not be detected. The resulting compounded instruction stream would still execute correctly, but fewer compounded instruction pairs would be tagged for parallel execution, and therefore CPU performance would decrease.

Figure 10:
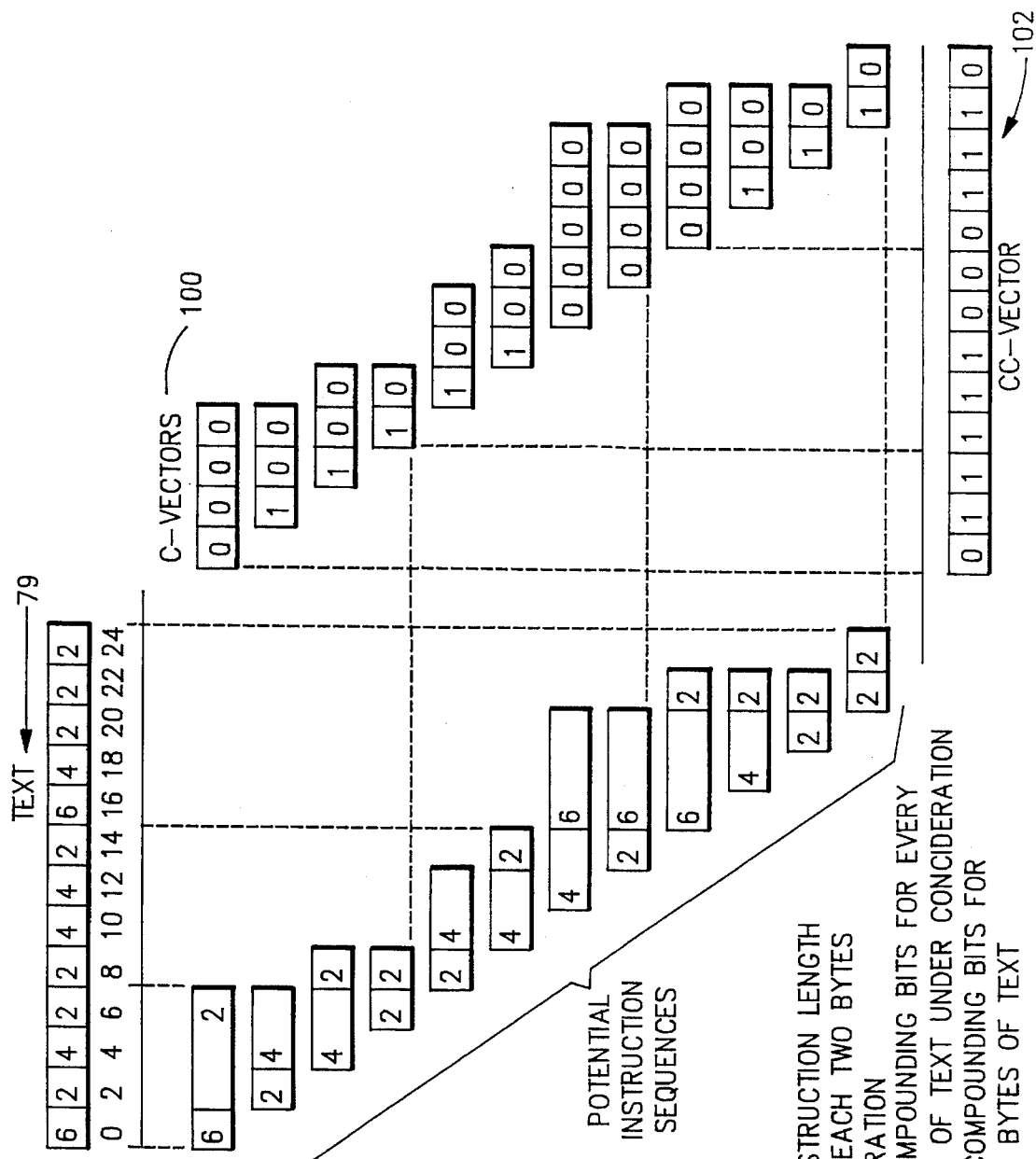
FIG. 10 is an analytical chart for a worst case instruction stream text having data intermixed with variable length instructions without a reference point, showing their related sets of possible compound identifier bits.

The preferred technique for dealing with Case G is shown in FIG. 10 for the same byte stream 79 as in FIG. 9. A new sequence of possible instructions is started at every halfword regardless of the values in the instruction length portion of the potential opcode field. As with the other cases, two adjacent potential instructions are examined and the appropriate identifier bits for various C-vectors 100 are determined. This is repeated starting two bytes (one halfword) later. As with the Case E, the various C-vector values for the same halfword are ORed together (See FIG. 11) to form the composite identifier bits of the related composite CC-vector 102. It is to be noted that in this particular embodiment where the compounder identifies a compound instruction by producing a "1" for the first byte only, and where in FIG. 10 each potential sequence is only two instructions in length, the output that results from examining each sequence using the preferred encoding scheme for two-way compounding is a single bit. Accordingly, to form the CC-vector 102 in this instance, all of the first identifier bits in in each sequence are concatenated, thereby producing the same CC-vector as would result in the general case of ORing the various C-vector values.

If a byte is selected for execution, it must in fact be an instruction if the program is correct, and the appropriate CC-vector identifier bit associated with that byte is checked to see if the byte is the beginning of a compound instruction. The tags associated with data will always be ignored during execution of actual instructions—both scalar instructions executed singly and compounded instructions executed in parallel.

If a branch instruction is compounded with data, the branch must be taken (assuming a correct program) and the second instruction in the pair which would have been executed in parallel, if the branch was not taken, is nullified. This capability must already be present in the execution unit if branches can be executed concurrently with a following instruction in a pipelined fashion.

It is important to note that the composite compounding sequences in the CC-vectors 88, 102 in FIGS. 9 and 10 are not the same, even though the text is identical. Since in FIG. 9 it is known that the text contains no data intermixed with the instructions, convergence results in a known reference point. The extra "1" values in the CC-vector 102 for FIG. 10 occur after the reference point is known in FIG. 9 and such extra "1"s do not correspond to halfwords that begin instructions because they account for the possibility of data being present in the text. However, if the text contains instructions only, as is assumed in the technique for Case E shown in FIG. 9, the different composite sequences in the two CC-vectors 88, 102 will nevertheless result in identical program execution in accordance with the advantages of the invention.

Case F involving fixed length instructions intermixed with data, and having no instruction reference point, is a simplified version of Case G. If the instructions are two bytes long aligned on halfword boundaries, then potential instruction sequences are started every halfword, and it is not necessary to use the instruction length to generate the potential sequences.

The worst case technique of FIG. 10 for dealing with Case G examines more possible instruction sequences than the techniques for Cases A–F. This may require more time and/or more compounding units to produce the necessary identifier bits in the tags, depending on the implementation.

There are many possible designs for an instruction compounding unit depending on its location and the knowledge of the text contents. In the simplest situation, it would be desirable for a compiler to indicate with tags which bytes contain the first byte of an instruction and which contain data. This extra information results in a more efficient compounder since exact instruction locations are known (see FIG. 13). This means that compounding could always be handled as Case C situations in order to generate the C-vector identifier bits for each compound instruction (See FIG. 8). A compiler could also add other information such as static branch prediction or even insert directives to the compounder.

Other ways could be used to differentiate data from instructions where the instruction stream to be compounded is stored in memory. For example, if the data portions are infrequent, a simple list of addresses containing data would require less space than tags. Such combinations of a compounder in hardware and software provide many options for efficiently producing compound instructions.

Figure 11:
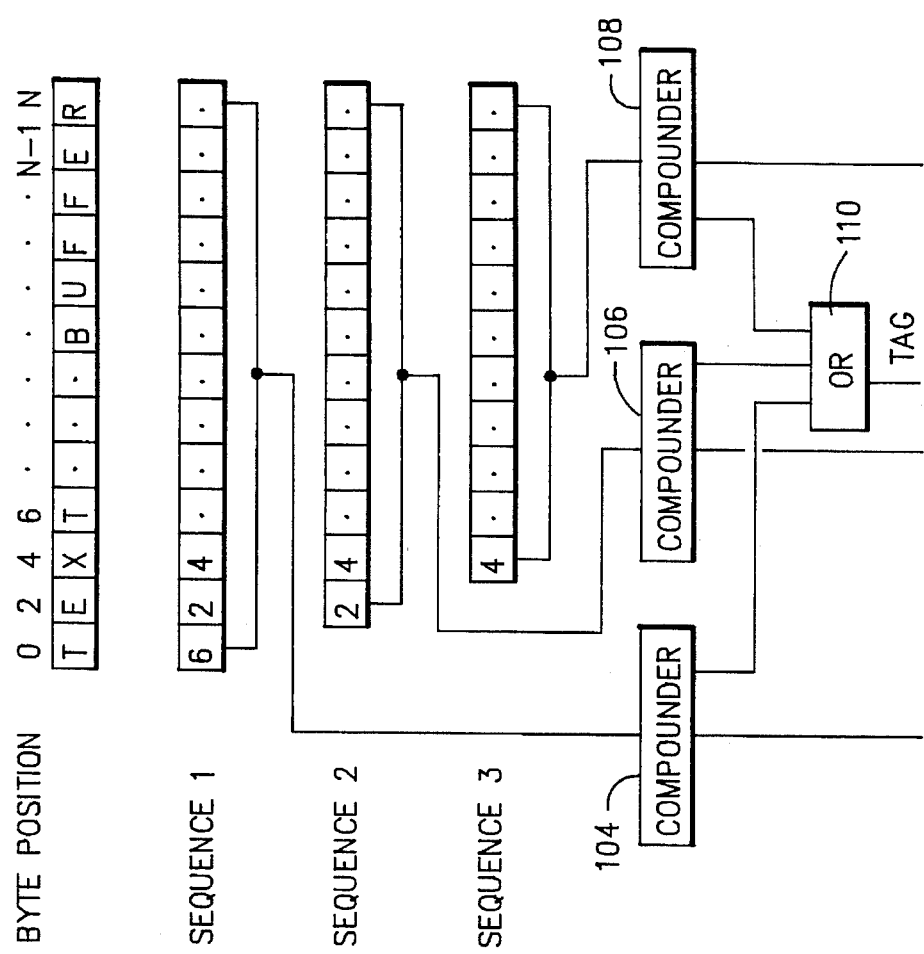
FIG. 11 illustrates a logical implementation of an instruction compound facility for handling the instruction stream texts of FIGS. 9 and 10.

FIG. 11 shows a flow diagram of a possible implementation of a compounder for handling instruction streams in either the Case E, F or G category. A multiple number of compounder units 104, 106, 108 are shown, and for efficiency purposes this number could be as large as the number of halfwords that could be held in a text buffer. In this version, as applied to Case G, the three compounder units could begin their processing sequences at the first, third, and fifth bytes, respectively. Upon finishing with a possible instruction sequence, each compounder starts examining the next possible sequence offset by six bytes from its previous sequence. Each compounder produces compound identifier bits (C-vector values) for each halfword in the text. The three sequences from the three compounders are ORed 110 and the resulting composite identifier bits (CC-vector values) are stored in association with their corresponding textual bytes.

FIG. 12 shows how the worst case compounding technique for Case G is applied to large groups such as up to four instructions in each compound instruction. Considering again the same byte stream 79, each byte at the beginning of a halfword is examined as if it were the beginning of an instruction and its opcode evaluated to locate a potential sequence of three additional instructions. If it cannot be compounded, its identifier bit value is "0". If it can be compounded with the next potential instruction, the identifier bits are "1" for the first instruction in the pair and "0" for the second instruction in the pair. If it turns out that it can be compounded with the next two potential instructions, the compounding bits beginning with the first instruction are "2", "1" and "0", respectively. This method assumes that a branch to the middle of a large group compound instruction can execute the triplet or pair group which are a tail-end subset of the large group.

As with FIG. 10, the bytes beginning at each halfword must be examined to locate potential instruction boundaries. Each examined sequence produces a sequence of identifier bits called C-vectors 112. A composite sequence of identifier bits called CC-vector values 114 is formed by taking the maximum value of all the individual identifier bits associated with that halfword. When a large group compound instruction is issued and executed, the CPU ignores all compound bits associated with bytes other than the first byte of the group. In this method of encoding, the compound identifier bits in the CC-vector 114 indicate the beginning of a compound instruction as well as indicate the number of instructions constituting the compound instruction.

Depending on the actual compounding rules used, there may be some optimizations for this particular large group compounding technique. For example, the fifth sequence starting at the ninth byte 116 assumes instructions of lengths 2, 4, 2 and 6 bytes long. Since 6-byte instructions are never compoundable in this example, there is no benefit in attempting to compound starting at the other three potential instructions (eleventh, fifteenth and seventeenth bytes) since they have already been compounded as much as possible. In that regard, the identifier bits for potential instructions beginning at the eleventh and fifteenth bytes are already indicated in the C-vector 112 at 118, 120, respectively. On the presumption that the ninth byte begins an instruction sequence at 116, the thirteenth byte does not begin an instruction. However, this optimization just described still requires the thirteenth byte to be examined at 122 as the beginning of a possible instruction, since it has not been previously considered.

Of course, the large group compound method would continue with all of the halfwords in the text, even though the illustrated example of FIG. 12 stops with the fifteenth byte.

In order to reduce the number of bits to transfer, there may be alternative representations of the compounding information. For example, the compounding identifier bits could be translated into a different format once a true instruction boundary is determined. For example, it is possible to achieve one bit per instruction with the following encoding: the value "1" means to compound with the next instruction, and the value "0" means to not compound with the next instruction. A compound instruction formed with a group of four individual instructions would have a sequence of compounding identifier bits (1,1,1,0). As with the execution of other compound instructions previously described, compounding identifier bits associated with halfwords which are not instructions and therefore do not have any opcodes are ignored at execution time.

While exemplary preferred embodiments of the invention have been disclosed, it will be appreciated by those skilled in the art that various modifications and changes can be made without departing from the spirit and scope of the invention as defined by the following claims.

We claim:

1. A method of processing instructions in an instruction stream in a data processing system, said instruction stream having no known instruction boundary reference points, to identify adjacent scalar instructions which are capable of parallel execution in a particular computer configuration, including operating said data processing system to perform the following steps:

generating different sequences of presumed instructions starting at different possible instruction boundaries; at least one of said sequences being a sequence of real instructions;

encoding said presumed instructions with identifier tags indicating the capability of adjacent presumed instructions of being executed in parallel and;

controlling the execution of said real instructions to be serial or in parallel in accordance with said identifier tags.

2. The method of claim 1 wherein the instructions have a given number of different possible lengths, and wherein said identifying step includes creating a different sequence of presumed instructions for each of said given number of different possible lengths.

3. The method of claim 2 wherein said given number of possible lengths is two or more.

4. The method of claim 2 wherein said given number of possible lengths are aligned on the byte boundaries when the different sequence is created.

5. The method of claim 1 wherein the capability of being executed in parallel is determined in said encoding step by comparing groups of two or more adjacent presumed instructions which instructions are in adjacent relationship with each other.

6. The method of claim 1 further comprising the step of combining said identifier tags into a composite sequence of identifier tags, said composite sequence of identifier tags providing an indication of which scalar instructions of said instruction stream can be executed in parallel.

7. The method of claim 6 wherein said identifier tags are binary bits which are combined in said composite sequence by ORing the binary bits of identifier tags encoded with corresponding presumed instructions.

8. The method of claim 6 wherein said identifier tags have digital values identifying the number of succeeding instructions in a presumed sequence which can be executed in parallel, said identifier tags in said composite sequence each having the highest digital value for the corresponding presumed instruction encoded in said step of encoding.

9. The method of claim 7 further comprising controlling the parallel execution of instructions in said instruction stream in accordance with said composite sequence of identifier tags by responding to the identifier tags corresponding to the first instruction of each sequence of adjacent instructions which can be executed in parallel and ignoring all other identifier tags in said composite sequence.

10. A method to determine and to indicate possible parallel execution of scaler instructions in a stream of instructions in a data processing system prior to fetching said instructions for execution by a processing unit of said data processing system, comprising operating said data processing system to perform the following steps:

grouping a byte stream in a window of a predetermined length into byte sequences that each comprise presumed instructions within said window;

generating a first compounding bit vector that indicates whether or not each presumed instruction within said window and its next adjacent presumed instruction can be compounded in accordance with compounding instruction rules;

grouping the bytes in said byte stream window of predetermined length in an another sequence that comprises another presumed instruction sequence in said window;

generating a second compounding bit vector;

repeating the previous steps for new presumed instruction sequences in said window a sufficient number of times to ensure that the actual instruction sequence within said window has been compounded;

forming a composite compounding vector by combining each of said compounding vectors from said previous steps into a single vector;

controlling the fetching of instructions in said window to be executed serially or in parallel by said processor unit in accordance with said composite compounding vector.

11. A method of identifying as in claim 10 including operating the data processing system to perform the further steps of:

examining a presumed first instruction to determine a first instruction length field value for said presumed first instruction in said first possible instruction sequence;

using said first instruction length field value to locate at least a presumed second instruction; and encoding said presumed first and said at least second instructions with a control identifier bit tag to indicate whether or not they are tagged as a potential instruction component of a compound instruction for parallel execution by a particular computer system configuration whereby in accordance with the hardware utilization requirements of the particular computer system at least two instructions are tagged for compounding and parallel execution in the particular computer system configuration.

12. The method of claim 11 further including the steps of examining the presumed second instruction to determine a second instruction length field value for said presumed at least second instruction in said first possible instruction sequence;

using said second instruction length field value to locate a presumed at least third instruction; and encoding said presumed second and said at least third instructions with a control identifier bit tag to indicate whether or not they are tagged as a potential instruction component of a compound instruction for parallel execution by a particular computer system configuration in accordance with the hardware utilization requirements of the particular computer system configuration.

13. The method of claim 12 wherein an encoding tag identifying the largest number of said as least three presumed instructions capable of parallel execution is maintained for use at instruction execution time in the particular computer system for which the preprocessing is employed.

14. The method of claim 12 wherein said encoding step includes encoding said presumed first and second and said at least third instructions with tags to indicate whether they may be compounded for parallel execution by a particular computer system configuration.

15. The method of claim 12 further including the steps of keeping track of the byte positions of the byte stream of information associated with said presumed instructions in said first possible instruction sequence;

keeping track of the byte positions associated with said presumed instructions in said second possible instruction sequence; and maintaining a separate identifier tag for each of the byte positions associated with said presumed instructions.

16. The method of claim 15 wherein an instruction is tagged for parallel execution whenever an instruction in either of said first or second possible instruction sequences in the byte stream of information is encoded for parallel execution.

17. The method of claim 11 further including the steps of starting a second possible instruction sequence by selecting another presumed instruction different from said presumed first instruction from said byte stream of information;

examining said another presumed instruction to determine another instruction length field value for said another presumed instruction in said second possible instruction sequence;

using said another instruction length field value to locate a further presumed instruction; and encoding said further and another presumed instructions with a control identifier bit tag to indicate whether or not they are tagged as a potential instruction component of a compound instruction for parallel execution by a particular computer system configuration in accordance with the hardware utilization requirements of the particular computer system configuration.

18. The method of claim 17 further including the steps of comparing said presumed first and second instructions in said first possible instruction sequence with said further and another presumed instructions in said second possible instruction sequence to detect a valid convergence between instruction boundaries and, if a valid convergence occurs, to collapse the sequences, and if a valid convergence does not occur, to continue the instruction sequences until the end of a window of possible instruction, such that, prior to convergence, tentative instruction boundaries are determined for each possible instruction sequence and control identifier bits are assigned for each instruction identifying the location of potential compound instructions in the byte stream of information.

19. The method of claim 11 wherein the byte stream of information includes instructions having a fixed length.

20. The method of claim 11 wherein the byte stream of information includes instructions having a variable length.

21. The method of claim 11 wherein the byte stream of information includes non-instructions intermixed with instructions.

22. The method of claim 11 wherein there are not any instruction boundary reference points in the byte stream of information.

23. The method of claim 22 wherein the byte stream of information includes non-instructions intermixed with instructions.

24. The method of claim 23 wherein the byte stream of information includes instructions having a variable length.

* * * * *